(12) United States Patent
Hatch

(10) Patent No.: US 6,347,113 B1
(45) Date of Patent: Feb. 12, 2002

(54) GLOBAL POSITIONING SYSTEM RECEIVER FOR MONITORING THE SATELLITE TRANSMISSIONS AND FOR REDUCING THE EFFECTS OF MULTIPATH ERROR

(75) Inventor: Ronald R. Hatch, Wilmington, CA (US)

(73) Assignee: NavCom Technology, Inc., Redondo Beach, CA (US)

(*) Notice: Subject to any disclaimer, the term of this patent is extended or adjusted under 35 U.S.C. 154(b) by 0 days.

(21) Appl. No.: 09/437,108

(22) Filed: Nov. 9, 1999

Related U.S. Application Data

(60) Provisional application No. 60/124,001, filed on Mar. 12, 1999.

(51) Int. Cl.⁷ .................................................. H04K 1/00
(52) U.S. Cl. ........................................ 375/149; 375/150
(58) Field of Search ................................. 375/147, 142, 375/145, 149, 150, 355, 346, 343; 342/357, 342

(56) References Cited

U.S. PATENT DOCUMENTS

| | | | | |
|---|---|---|---|---|
| 4,485,383 A | * | 11/1984 | Maher | 375/365 |
| 4,599,732 A | * | 7/1986 | LeFever | 375/355 |
| 4,701,934 A | * | 10/1987 | Jasper | 342/418 |
| 5,390,207 A | | 2/1995 | Fenton et al. | 375/1 |
| 5,402,450 A | * | 3/1995 | Lennen | 375/346 |
| 5,414,729 A | | 5/1995 | Fenton | 375/209 |
| 5,495,499 A | | 2/1996 | Fenton et al. | 375/205 |
| 5,541,606 A | * | 7/1996 | Lennen | 342/352 |
| 5,621,416 A | * | 4/1997 | Lennen | 342/352 |
| 5,734,674 A | | 3/1998 | Fenton et al. | 375/207 |
| 5,808,582 A | | 9/1998 | Woo | 342/357 |
| 5,809,064 A | | 9/1998 | Fenton et al. | 375/208 |
| 5,815,539 A | * | 9/1998 | Lennen | 375/367 |

FOREIGN PATENT DOCUMENTS

| WO | WO 96/37789 | 11/1996 |
|---|---|---|
| WO | PCT/US00/06124 | 8/2000 |

OTHER PUBLICATIONS

The Multipath Estimating Delay Lock Loop: Approaching Theoretical Accuracy Limits, R. D. J. van Nee et al., IEEE, pp. 246–251 (1994).

Theory and Performance of Narrow Correlator Spacing in a CPS Receiver, A. J. van Dierendonck et al., Navigation: Journal of The Institute of Navigation, vol. 39, No. 3, pp. 265–283 (1992).

Effects of Multipath on Coherent and Noncoherent PRN Ranging Receiver, L. L. Hagerman, Aerospace Report No. TOR–0073(3020–03)–3, pp. iii–viii, 1–40 (1973).

* cited by examiner

Primary Examiner—Tesfaldet Bocure
(74) Attorney, Agent, or Firm—Pennie & Edmonds LLP

(57) ABSTRACT

A Global Positioning System receiver includes an intermediate frequency (IF) processor configured to downconvert broadcast signal to generate a first channel signal which is further downconverted to recover a PRN signal by an angle rotator. The receiver further includes a signal generator configured to generate N gated PRN signals. The N gated PRN signals are generated based on a local replica PRN signal time-divided by M intervals within a chip period of the local replica PRN signal. N and M are positive integers. A number of correlators is also provided. Each of which the correlators are configured to multiply a respective one of N gated PRN signals with the PRN signal to generate a number of correlation values. The correlation values are utilized to monitor distortions in the broadcast signal and/or to track the PRN signal with the local replica PRN signal. Further, methods of monitoring and/or tracking the PRN signal with the local replica PRN signal by utilizing the correlation values are also provided.

92 Claims, 15 Drawing Sheets

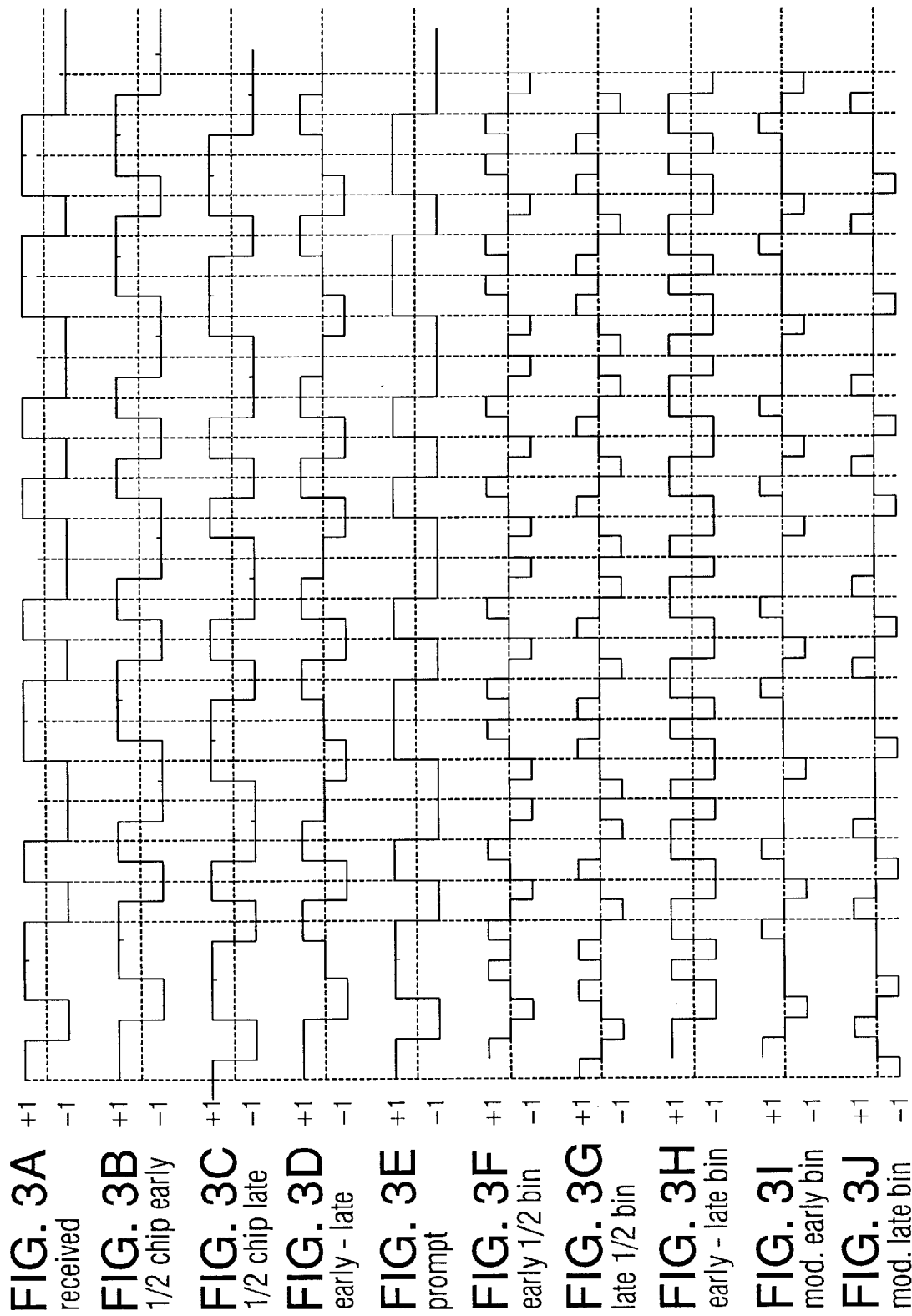

1/2 chip early

1/2 chip late

1/2 early - 1/2 late
correlator early 1/2 bin
transitions only late 1/2 bin
transitions only early 1/2 bin
all chips late 1/2 bin
all chips

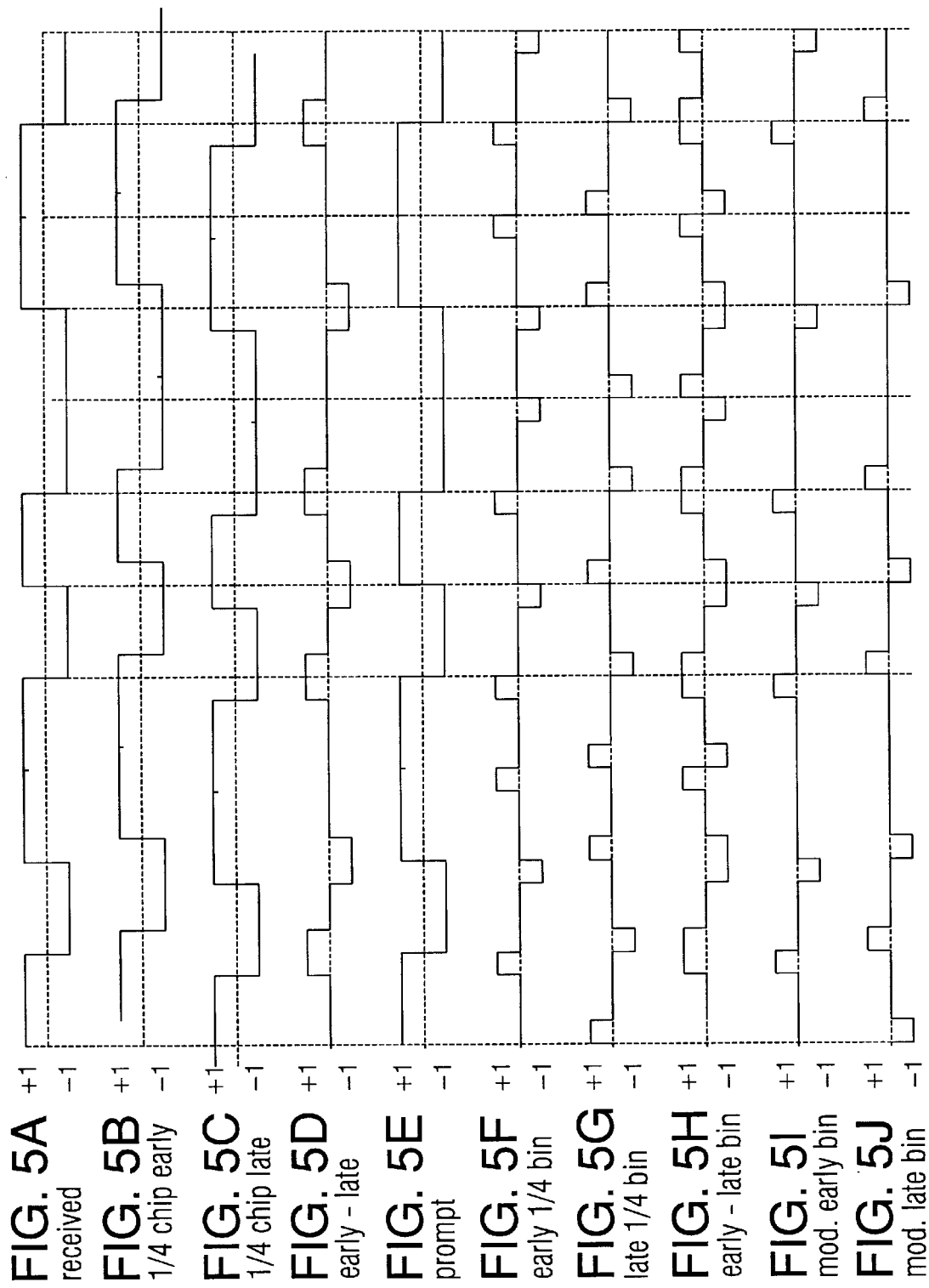

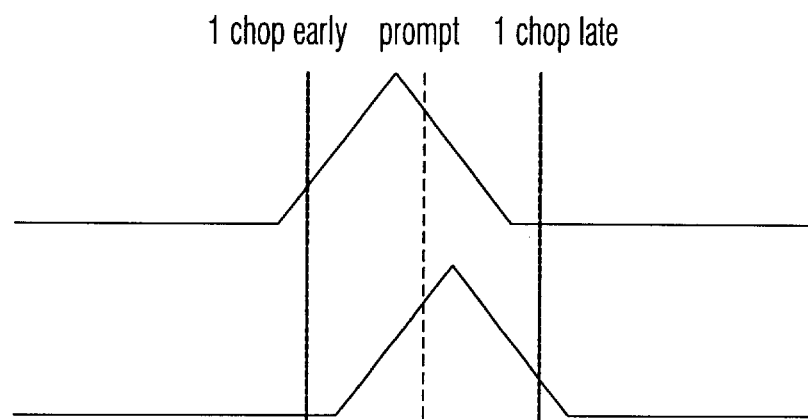
FIG. 6A
1/4 chip early
FIG. 6B
1/4 chip late
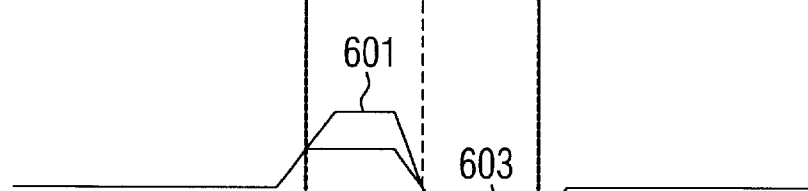
FIG. 6C
1/4 early - 1/2 late
correlator
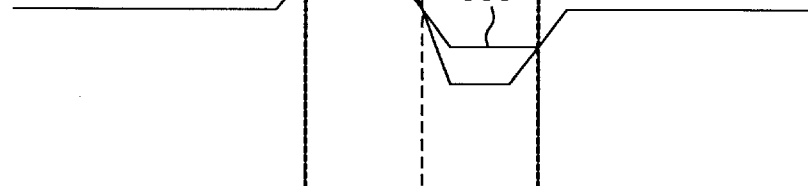
FIG. 6D
early 1/4 bin
transitions only
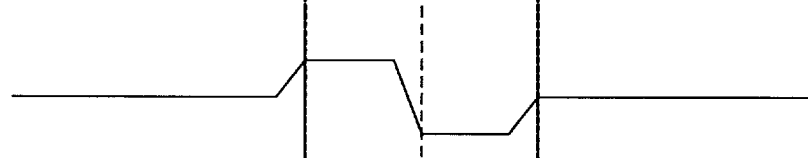
FIG. 6E
late 1/4 bin
transitions only
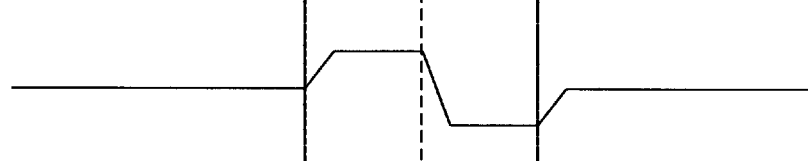
FIG. 6F
early 1/4 bin
all chips
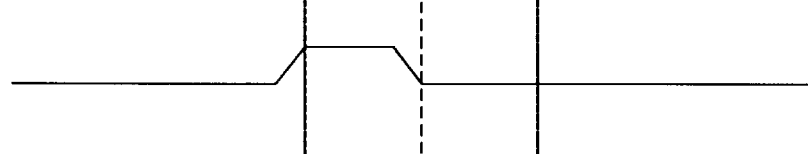
FIG. 6G
late 1/4 bin
all chips
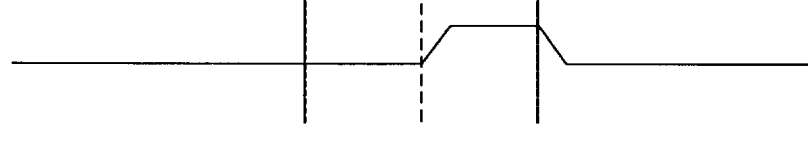

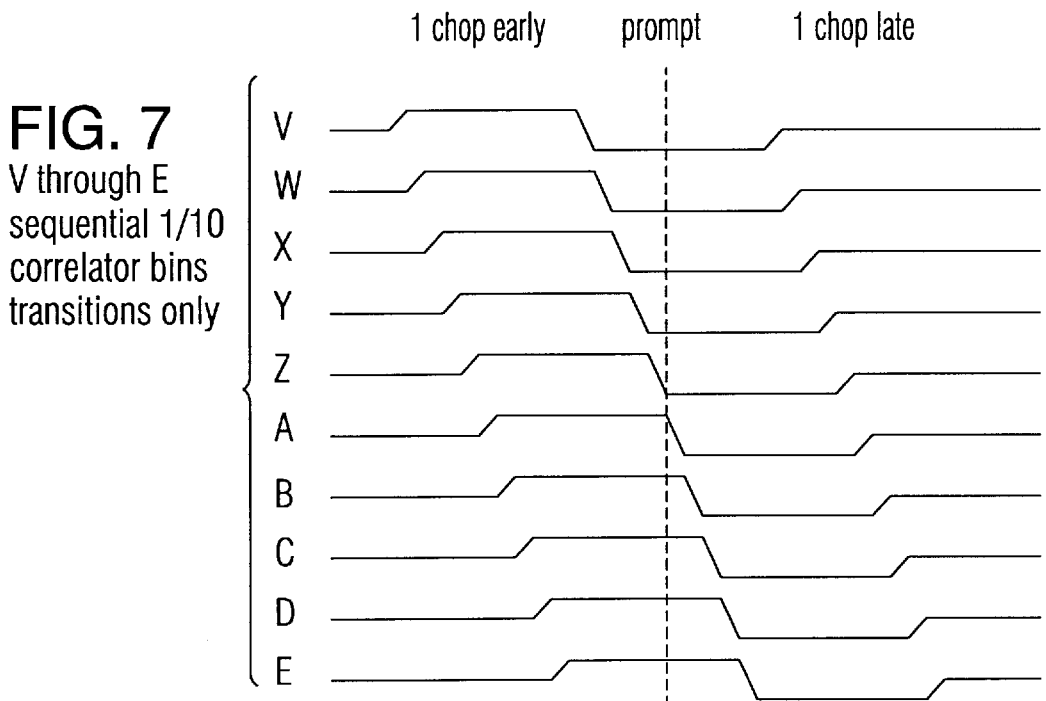
FIG. 7F
summation of bins V through E
FIG. 7G
sum of bins Z and A
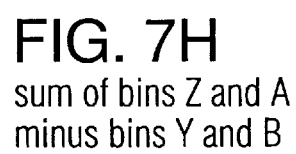
FIG. 7H
sum of bins Z and A minus bins Y and B

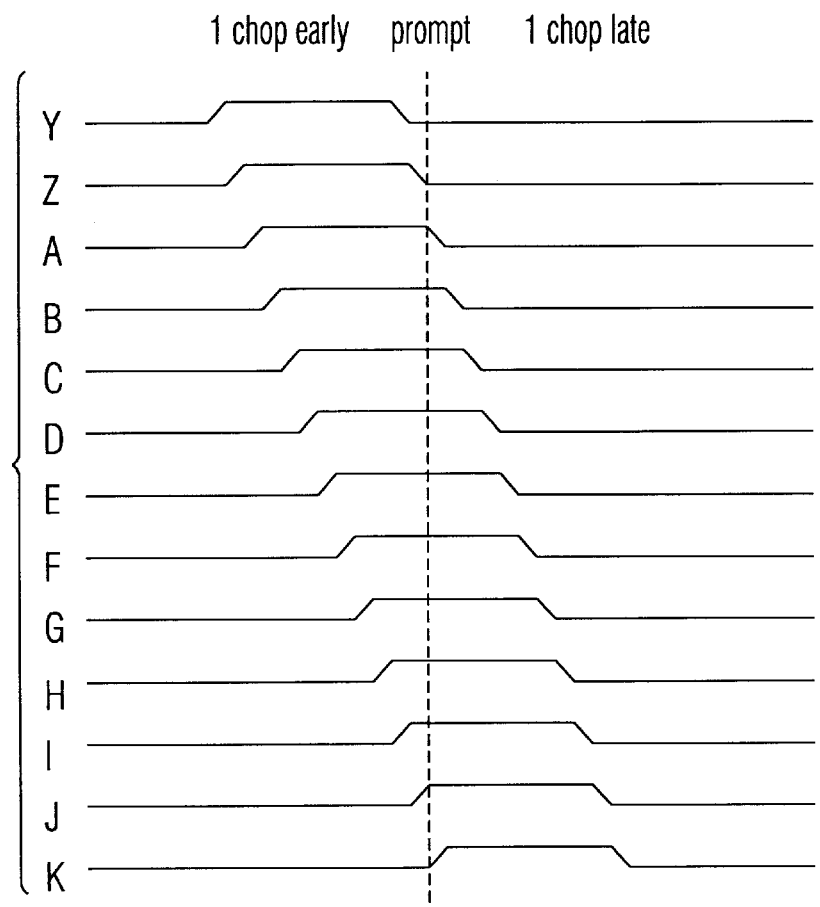
FIG. 8
Y through k sequential 1/10 correlator bins all chips
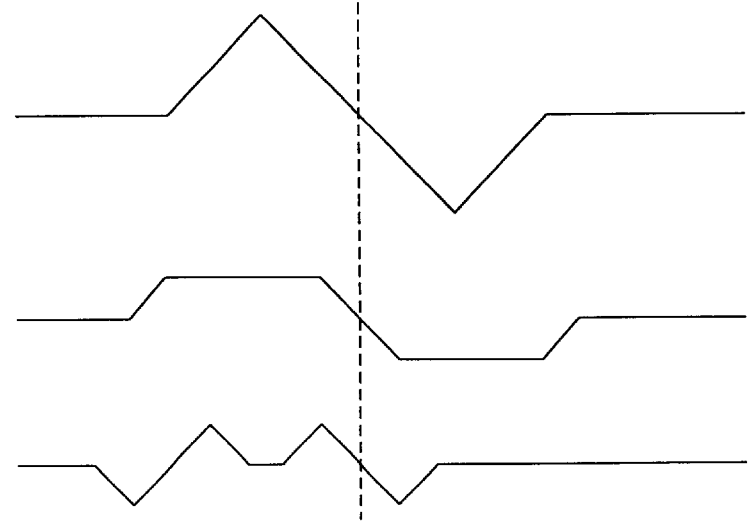
FIG. 8L
bins A+B+C+D+E −F−G−H−I−J
FIG. 8M
bin Z minus bin K
FIG. 8N
sum of bins Z and A minus bins Y and B

GLOBAL POSITIONING SYSTEM RECEIVER FOR MONITORING THE SATELLITE TRANSMISSIONS AND FOR REDUCING THE EFFECTS OF MULTIPATH ERROR

CROSS-REFERENCE TO RELATED APPLICATIONS

This application claims the benefit of U.S. Provisional Application No. 60/124,001 filed Mar. 12, 1999.

FIELD OF THE INVENTION

The present invention relates generally to a Global Positioning System (GPS) receiver for satellite-based navigation systems such as the U.S. Global Positioning System, the Russian Global Navigation System or the like. More specifically, the present invention is directed to a GPS receiver configured to decode pseudo random noise (PRN) codes from broadcasted signals of the navigation systems.

BACKGROUND OF THE INVENTION

Radio navigation systems such as the United States' Global Positioning System (GPS), the Russian Global Navigation System (GLONASS) or the like are configured to broadcast signals that include navigation data encoded therein. The navigation data include each satellite's ephemeris data, e.g., their positions and time indicated by their onboard navigational devices and clocks, respectively.

A conventional GPS receiver determines positions of the GPS satellites and transmission time of broadcasted signals therefrom by passively receiving and decoding the broadcasted signals. More specifically, the GPS receiver, by obtaining the arrival times of the broadcasted signals transmitted by the satellites in the receiver's field of view, which are precisely measured relative to the receiver's own clock, obtains its distances (ranges) to the respective satellites within a constant bias. The value of the constant bias is substantially equal to the difference between the satellites' and the receiver's clock times. Since the satellites' clocks are synchronized closely to a system time, this constant bias is, within some very small error, substantially the same for all satellites. Distances between the GPS receiver and the satellites from which the received broadcasted signals sent are called pseudoranges, and they are offset from the actual distances by a constant value proportional to the constant bias. With four or more satellites in view, the four unknowns consisting of the receiver's position (longitude, latitude, and elevation) and the receiver's clock offset with respect to the system time can be solved using the measured receiver-to-satellite pseudoranges, and the satellites' ephemeris data in the navigation data broadcasted by the satellites.

In order to allow the receiver to measure the pseudoranges, the satellites' broadcasted signals are wide band pseudo random noise (PRN) coded signals. These PRN coded signals are radio frequency (RF) carriers modulated by a wide band PRN code, e.g., modulo-2 added to the navigation data. A unique PRN code is assigned to each satellite, and different types of PRN codes with different chip rates are used for different system applications. For instance, in the U.S. GPS, a 1 MHZ chip rate C/A code is used for initial acquisition and less accurate civilian applications, while a 10-MHZ chip rate P-code is used for higher accuracy military applications. The PRN codes are designed such that cross-correlation between different PRN codes from different satellites is minimized. For example, the GPS C/A codes are 1023 chip length Gold codes which have a maximum periodic cross-correlation value of only 65. This design feature allows the receiver to separate the ranging signals received from a number of GPS satellites by acquiring and tracking the unique PRN codes of the GPS satellites even though they are transmitted on the same RF frequency (1575.42 MHZ for GPS LI and 1227.6 MHZ for GPS L2).

A conventional circuit used to track the PRN signals is a delay lock loop that correlates early, punctual, and late versions of locally generated PRN codes against the received signal. Further, the delay lock loop obtains an estimate of the time difference between the locally generated code and the received code from the difference between the correlation of the early version of the locally generated code against the received signal and the correlation of the late version of the locally generated code against the received signal.

The accuracy of the receiver is affected by several factors: the accuracy of the satellite ephemeris data and clock time given in the satellite's navigation data, the propagation delays introduced by the ionosphere and the troposphere, receiver noise and quantization effects, radio frequency interferences, multipath effects, and the relative geometry of the satellites and the GPS receiver, which is measured in terms of geometric dilution of precision. Some of these error sources, in particular, the satellite ephemeris data and clock errors, the ionospheric and tropospheric delays, can be substantially eliminated in a differential GPS (DGPS) system, which can be either local area differential or wide area differential. (The Federal Aviation Agency (FAA) is developing both types of differential systems. Specifically, a Local Area Augmentation System (LAAS) is being developed for installation at airports for use in aircraft landing, and a Wide Area Augmentation System (WAAS) is being developed for en route navigation and lower accuracy landing requirements.)

In local area differential systems, the error in the determined position of a reference receiver, which is generally located at a precisely surveyed site, are subtracted from the position obtained by of the GPS receiver or, alternatively, the measured errors in the pseudoranges at the reference site are subtracted from the measured pseudoranges of the GPS receiver. For such local DGPS applications the GPS receiver is located usually within 10 to 50 kilometers of the reference receiver. Under these circumstances the error caused by the satellite ephemeris data, clock and by ionospheric and tropospheric delays are almost identical at both the user receiver and reference receiver, and are thus practically canceled in the correction process. The major error sources remaining are then receiver noise, receiver quantization and multipath effects. These effects are uncorrelated between the reference and user receivers, and are not canceled from each other in the correction process.

In wide area differential systems, the correlation of ionospheric, tropospheric and satellite orbital errors are decreased because of the increased distance between the reference receivers and the user receivers. To alleviate this decreased correlation, a wide area DGPS system, e.g., the FAA's WAAS, will typically send separate corrections for the satellite clock errors, the satellite orbit errors and for the ionospheric refraction effects. The correction signals are derived from a network of ground reference stations that estimate the satellite clock and ephemeris data errors and the ionospheric refraction effects at specific grid points from which the user receiver can compute its specific expected errors. Similar to the local area DGPS systems, most of the error sources are mitigated in the correction process except for receiver noise, quantization noise, interference, and multipath effects. The effects of the receiver's thermal and quantization noise can be reduced through averaging. The interference can be reduced with frequency management and regulation. The multipath effects thus become the most detrimental error source in DGPS systems. Sub-meter accuracy can generally be obtained by DGPS if the multipath error can be reduced sufficiently. However, multipath error in C/A code PRN tracking with early minus late discriminators can be as large as one chip (300 meters) and is usually several meters in magnitude. Reduction of multipath effects is thus an important design consideration in high quality GPS receivers.

The number of multipath signals, their relative delays and RF phase offsets with respect to the direct path signal are all functions of the satellite to the receiver's antenna geometry relative to reflecting objects around the receiver antenna. Since multipath signals always travel a longer distance than the direct path signal, they are invariably delayed with respect to the direct path signal and will suffer a loss in power in the reflection process. If the multipath signal has a delay in excess of one PRN chip in time with respect to the direct path signal, it will not correlate with the locally generated code and will not affect the pseudorange measurement accuracy once the delay lock loop is locked onto the direct path signal. However, if the multipath delay with respect to the direct path signal is within one chip in time, the error signal measuring the relative time offset between the local code and the received signal in an early-minus-late discriminator configuration is usually biased by the multipath signal. For C/A code receivers this problem is significant since the C/A code chip time is one microsecond in length, allowing multipath signals to be delayed with respect to the direct path signal by as much 300 meters to influence the pseudorange measurement accuracy. In addition, since the chip time is equivalent to 300 meters in length, multipath error, even if a small fraction of a C/A chip, can be very detrimental. Multipath error is thus one of the larger error contributors in DGPS systems and considerable design effort has been expended to develop receivers which are resistant to the multipath effects.

There are a number of techniques which have been developed to minimize the errors due to multipath effects. These include: (1) careful site selection to minimize the number of signal reflectors in the nearby environment; (2) antenna design to decrease the sensitivity to signals arriving at the antenna from low elevation angles typical of reflected signals; and (3) by receiver processing techniques. Site selection is always recommended but natural ground reflections generally limit its usefulness. Antenna design can be of significant benefit but because of cost, size and weight problems such specific antenna design is generally limited to permanent reference receiver locations. As a result, multipath reduction by specific receiver design has received significant attention and a number of techniques have been developed. Specific techniques include: (a) narrowing the early minus late correlator spacing (Three documents describing this technique are: (1) U.S. Pat. No. 5,495,499, Feb. 27, 1996, Fenton et al; (2) Van Dierendonck et al. "Theory and Performance of Narrow Correlator Spacing in a GPS Receiver," *Navigation: Journal of the institute of Navigation*, Vol. 39, No. 3, (Fall 1992); and (3) Hagerman, "Effects of Multipath on Coherent and Noncoherent PRN Ranging Receivers," Aerospace Corporation Report No. TOR-0073(3020-03)-3 May 15, 1973); (b) specifically estimating the multipath error contribution by estimating the distortion of the correlation curve at multiple points and inferring from the distortion the magnitude and phasing of one or more reflected signals (see U.S. Pat. No. 5,414,729, May 9, 1995, Fenton); and (c) constructing special discriminator patterns sensitive to the rising edge of the correlator pattern which are less sensitive to multipath distortion because the discriminator is not affected by signals which arrive during the later portions of the correlation curve. (See U.S. Pat. No. 5,808,582, Feb. 5, 1997, Woo; and International Patent No. WO 96/37789, Nov. 28, 1996, Hatch et al.)

These different multipath reduction techniques all work with varying degrees of success and have been implemented in receivers by different manufacturers. However, these receivers with different correlator design have been found to present a potential safety problem to the FAA in its design of the high integrity WAAS and LAAS DGPS systems. GPS satellite PRN 19, not long after its launch, was observed to yield a significantly different pseudorange measurement for receivers with a 1.0 correlator spacing as compared to receivers with a 0.1 correlator spacing. Various fault modes in the satellite have been suggested. One of the more probable faults was an impedance mismatch at one of the signal cable connectors, causing reflections in the cable and a resultant broadcast signal with distortion similar to ground multipath effects. In any case, the PRN 19 satellite problem caused the FAA to initiate a study of potential distortions in the satellite signal which could distort the shape of the correlation curve such that receivers with different correlator spacing or different correlation discriminator design to yield different and possibly hazardous pseudorange measurements.

Two solutions have been suggested to solve the correlator sensitivity problem. The first solution is for the FAA to specify that the airborne receivers use the same correlator spacing and discriminator design as is used in the ground reference receivers. Existing WAAS ground reference receivers track the satellites with both a 1.0 correlator spacing and a 0.1 correlator spacing. Thus, this solution would involve the specification of either a 1.0 correlator spacing or a 0.1 correlator spacing in the airborne receiver. This solution is not favored by the airborne receiver designer for several reasons. First, the 1.0 correlator spacing is highly sensitive to multipath error and thus is clearly a substandard receiver. Second, the 0.1 correlator spacing has been patented by a Canadian company and is apparently not available for royalty free use. Third, the narrow correlator could still lead to hazardous pseudorange measurements if the satellite signal is distorted such that the narrow correlator could lock up on a sub-peak of the correlation curve. Fourth, the specification of specific receiver design does not allow innovation and product improvement. For example, the more effective multipath reduction techniques described above that observed the rising edges of the correlation curves would be specifically excluded.

The second solution available to the FAA is to monitor the shape of correlation curve at a sufficient number of points to ensure that the satellite is not broadcasting a signal with any significant distortion. This is, by far, a desirable solution. However, the phase one WAAS ground reference receivers are already in place, and, therefore, to modify those receivers to include correlators to monitor the correlation curve at more places is a very expensive proposition. But, for phase two WAAS implementation, replacing the existing ground reference receivers to monitor the entire correlation curve is highly desirable. In addition, the reference receivers for the LAAS systems installed for landing purposes at airports should also be capable of monitoring the entire correlation curve resulting from the broadcast satellite signals.

In view of the above, it will be appreciated that a receiver capable of monitoring the entire correlation curve, without the need to duplicate the receiver channel hardware for each correlator spacing or discriminator design, would be extremely beneficial and cost effective as a ground reference receiver and would eliminate the need to specify precisely the airborne receiver design.

SUMMARY OF THE INVENTION

The present invention provides a GPS receiver for reducing the multipath effects and for monitoring correlation curves of broadcasted signals from GPS satellites. The GPS receiver of the present invention processes the broadcast signal that includes a carrier frequency signal modulated by a Pseudo Random Code (PRN) signal. The receiver of the present invention includes an intermediate frequency (IF) processor configured to downconvert the broadcast signal to generate a first channel signal. The first channel signal is further downconverted by an angle rotator, to thereby recover the PRN signal from the broadcast signal. The recovered PRN signal is then processed by a signal generator configured to generate N gated PRN signals. The N gated PRN signals are generated based on a local replica PRN signal time-divided by M intervals within a chip period of the local replica PRN signal. The receiver of the present invention also includes a number of correlators each of which is configured to multiply a respective one of N gated PRN signals with a first phase signal of the PRN signal to generate a number of correlation values.

If desired the receiver of the present invention may also include a first processor configured to adjust timing of the local replica PRN signal based on the first plurality of correlation values in order to accurately track the PRN signal with the local replica PRN signal. In an alternative arrangement, the receiver of the present invention may also include a second processor configured to monitor for distortions in the broadcast signal based on a relationship among the correlation values.

The present invention is also directed to a method of processing the navigation broadcast signal that includes a carrier frequency signal modulated by a Pseudo Random Code (PRN) signal. The method includes the steps of downconverting the broadcast signal, to thereby recover the PRN signal from the broadcast signal, and generating N gated PRN signals, wherein the N gated PRN signals are generated based on a local replica PRN signal time-divided by M intervals within a chip period of the local replica PRN signal. Here, N and M are positive integers. The N gated PRN signals are then multiplied with a first phase signal of the PRN signal to generate a number of correlation values.

If desired the method of the present invention also includes the step of adjusting timing of the local replica PRN signal based on the correlation values in order to accurately track the PRN signal with the local replica PRN signal. In an alternative method, the present invention may also include the step of monitoring for distortions in the broadcast signal based on a relationship among the correlation values.

DESCRIPTION OF THE DRAWINGS

Preferred features of the present invention are disclosed in the accompanying drawings, wherein similar reference characters denote similar elements throughout the several views, and wherein:

FIG. 3A shows a typical (noise free) received PRN code sequence;

FIG. 3B shows a locally generated PRN code sequence shifted one-half chip early;

FIG. 3C shows a locally generated PRN code sequence shifted one-half chip late;

FIG. 3D shows a locally generated discriminator pattern formed by taking the product of the one-half chip early and the one-half chip late code sequence;

FIG. 3E shows a locally generated PRN prompt code sequence aligned with the received PRN sequence shown in FIG. 3A;

FIG. 3F shows an early ½ bin pattern for Mode 2 operation when the prompt code is split into two bins;

FIG. 3G shows a late ½ bin pattern for Mode 2 operation when the prompt code is split into two bins;

FIG. 3H shows a discriminator pattern formed from the early ½ bin (FIG. 3F) minus the late ½ bin (FIG. 3G);

FIG. 3I shows an early ½ bin value shown in FIG. 3F for Mode 2 operation modified such that bin value remains zero except for chips following a transition which defines Mode 1 operation;

FIG. 3J shows a late ½ bin value shown in FIG. 3G for Mode 2 operation modified such that the bin value remains zero except for chips immediately following a transition which defines Mode 1 operation;

FIG. 5A shows a typical (noise free) received PRN code sequence, a time-lengthened version of the received PRN code depicted in FIG. 3A;

FIG. 5B shows a locally generated PRN code sequence shifted one-quarter chip early;

FIG. 5C shows a locally generated PRN code sequence shifted one-quarter chip late;

FIG. 5D shows a locally generated discriminator pattern formed by taking the product of the one-quarter chip early and the one-quarter chip late code sequence;

FIG. 5E shows a locally generated PRN prompt code sequence aligned with the incoming sequence shown in FIG. 5A;

FIG. 5F shows an earliest ¼ bin value for Mode 2 operation when the prompt code is split into four bins;

FIG. 5G shows a latest ¼ bin value for Mode 2 operation when the prompt code is split into four bins;

FIG. 5H shows a discriminator pattern formed from the earliest ¼ bin (FIG. SF) minus the latest ¼ bin (FIG. 5G);

FIG. 5I shows an earliest ¼ bin value shown in FIG. SF for Mode 2 operation modified such that bin value remains zero except for chips following a transition which defines Mode 1 operation;

FIG. 5J shows a latest ¼ bin value shown in FIG. 5G for Mode 2 operation modified such that the bin value remains zero except for chips immediately following a transition which defines Mode 1 operation;

FIG. 6A illustrates a correlation function as the ¼ chip early code shown in FIG. 5B is slewed past the received code shown in FIG. 5A;

FIG. 6B illustrates a correlation function as the ¼ chip late code shown in FIG. 5C is slewed past the received code shown in FIG. 5B;

FIG. 6C shows two discriminator function curves;

FIG. 6D illustrates the correlation function obtained as the Mode 1 earliest ¼ bin pattern of FIG. 5I is slewed past the received code of FIG. 5A;

FIG. 6E illustrates the correlation function obtained as the modified Mode 1 latest ¼ bin pattern of FIG. 5J is slewed past the received code of FIG. 5A;

FIG. 6F illustrates the correlation function obtained as the Mode 2 earliest ¼ bin shown in FIG. 5F is slewed past the received code shown in FIG. 5A;

FIG. 6G illustrates the correlation function obtained as the Mode 2 latest ¼ bin shown in FIG. 5G is slewed past the received code shown in FIG. 5A;

FIG. 7 V through E show the Mode 1 (transitions only) correlation function obtained for 10 bins of $\frac{1}{10}^{th}$ chip width which are obtained as they are slewed together past the received PRN code signal;

FIG. 7F shows that the summation of the 10 bins defined in FIG. 7V through 7E result in the standard 1 chip spacing discriminator function;

FIG. 7G shows that the sum of bins Z and A result in a standard 0.2 narrow correlator discriminator function;

FIG. 7H shows the result of adding bins Z and A and subtracting from that sum bins Y and B. The result is a multipath reduction discriminator function;

FIG. 8 Y through K show the Mode 2 (all chips) correlation function obtained for 13 bins of $\frac{1}{10}^{th}$ chip width which are obtained as they are slewed together past the received PRN code signal;

FIG. 8L shows that the summation of bins defined in FIG. 8A through 8E minus the summation of bins defined in FIG. 8F through 8J result in a discriminator function which is similar to the standard 1 chip spacing discriminator function but which does not see multipath more than one chip away from the direct path;

FIG. 8M shows that bin Z minus bin K results in a discriminator function approximating the standard 0.2 narrow correlator discriminator function;

FIG. 8L shows the result of adding bins Z and A and subtracting from that sum bins Y and B. The result is a multipath reduction discriminator function even less sensitive to multipath than the Mode 1 equivalent;

DETAILED DESCRIPTION OF PREFERRED EMBODIMENTS

Figure 1:
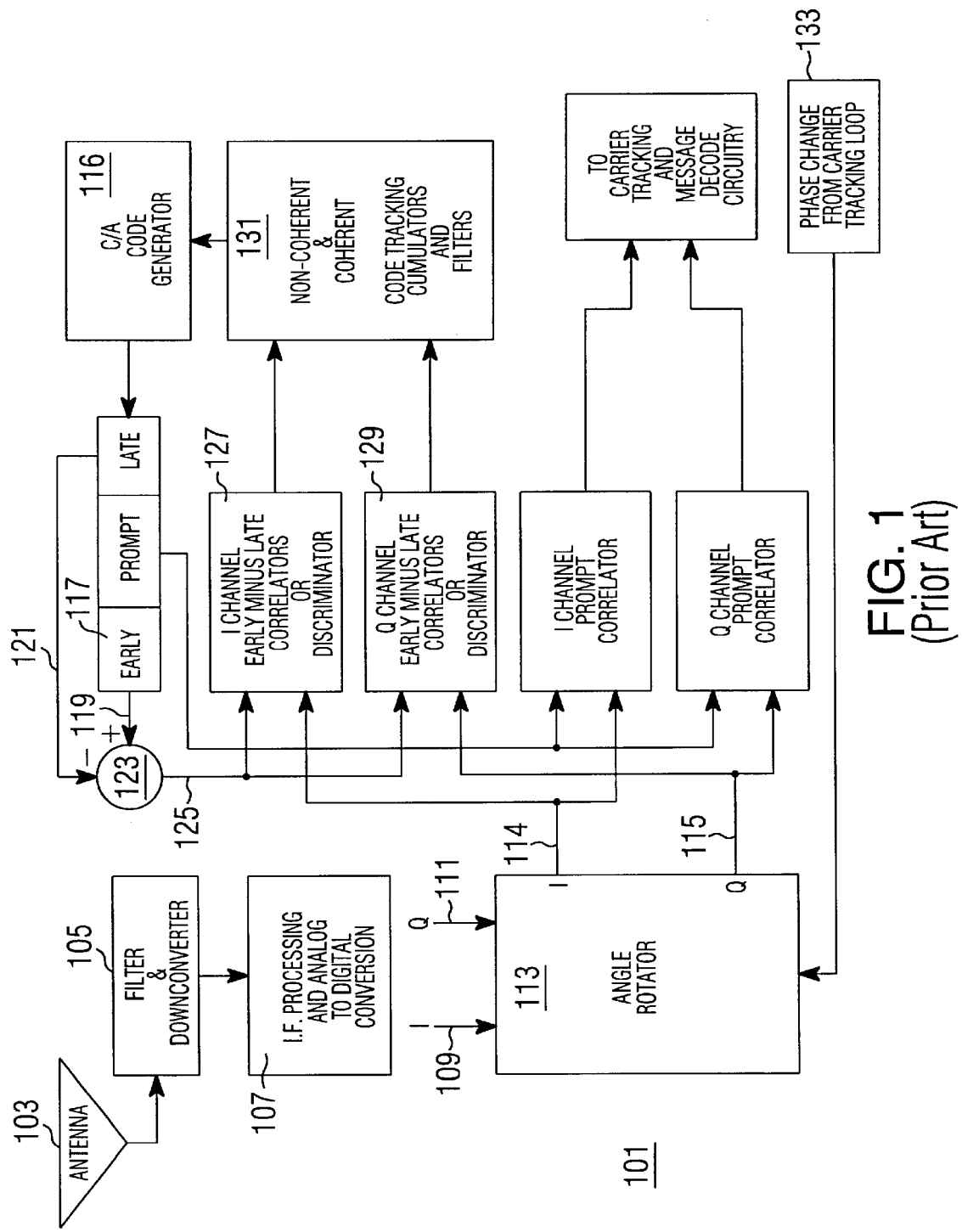
FIG. 1 shows a block diagram of a typical implementation of a receiver code tracking loop.

Referring to FIG. 1, a typical Global Positioning System (GPS) receiver 101 includes an antenna 103 to receive broadcast signals from GPS satellites. More specifically, the antenna 103 is configured to simultaneously receive L1 (1.5742 GHz.) and L2 (1.227 GHz.) PRN modulated radio frequency signals from a plurality of GPS satellites within the GPS receiver's field of view. It should be noted that, for illustrative purposes, only the L1 signal will be described, except where the L2 signal is specifically addressed. Therefore, the following discussions directed to the L1 signal can be equally applied to the L2 signal.

The received radio frequency signals are filtered and down converted to a lower frequency by a filter/downconverter 105 and then fed to an intermediate frequency (IF) and analog to digital (A/D) conversion circuit 107. The IF processing and A/D conversion circuit 107 outputs two digital signals in phase quadrature, an L1 in-phase signal and an L1 quadrature (90 degrees phase shifted from the in-phase signal) signal, designated I 109 and Q 111, respectively. Output signals of the IF and A/D conversion circuit 107 are then fed to multiple channels of circuitry. Each channel processes signals received from one GPS satellite.

Only one such channel is illustrated in FIG. 1. The first element of each channel circuitry is an angle rotator 113. During a non-coherent mode of code tracking, the angle rotator 113 allows the frequency of its input signals to be further reduced and, thereafter, processes both the I 109 and Q 111 digital signals together in order to align a locally generated PRN code with the PRN code signal received from the respective satellite. During a coherent mode, i.e., when Costas carrier phase lock has been achieved, the angle rotator 113 reduces the I 109 and Q 111 digital signals to constant phase representations, i.e., the received PRN code signal: I signal 114 is proportional to the signal strength, and Q signal 115 is proportional to a corresponding signal strength multiplied by a residual phase error. Since the Q signal 115 is used to close the Costas phase tracking loop, the average value of Q signal 115 becomes substantially equal to zero when the carrier phase lock is achieved.

The remainder of FIG. 1 shows a typical delay lock loop (DLL) associated with one of the channels. The typical DLL includes a local PRN code generator 116 (a C/A code generator in this case) that generates and feeds a locally generated C/A code signal to an Early-Late (E-L) signal generator 117, which outputs an early, late and prompt patterns of the locally generated C/A code. The DLL further includes an adder 123 configured to add the early 119 and a sign inverted late 121 patterns of the locally generated C/A code. This results in a correlation pattern signal 125 which is correlated, e.g., multiplied, with I 114 and Q 115 signals by a pair of I and Q channel correlators 127, 129. Correlator function values, i.e., output values of the I and Q channel correlators 127, 129 are then fed into a code tracking cumulators and filters 131. The cumulators and filters 131 then adjust the timing of the locally generated C/A code based on the correlator function values.

FIG. 3A–D and FIG. 4A–C illustrate exemplary signal patterns of the above described typical DLL. For illustrative purposes, signals depicted in these drawings illustrate noise free state and an infinite signal bandwidth of the depicted signals. The actual signals received from the satellites exhibit rounded corners. (It should be noted that, in FIGS. 3A–J and FIGS. 5A–J, time reference flows from their respective right-hand sides to their respective left handsides. In other words, signal patterns depicted on the righthand side of the drawings occurred earlier than those signal patterns on the left-hand side.)

Briefly referring back to FIG. 1, the conventional DLL multiplies the I 114 and Q 115 received PRN code signals by an early representation 119 and by the late representation 121 of the PRN code as discussed above. Now referring to FIGS. 3A–C, FIG. 3A shows a typical pattern of the PRN code signal of an incoming PRN code signal, i.e., the 1114 signal, and FIGS. 3B and C show the early and late patterns of the locally generated PRN code, respectively.

Figure 4A:
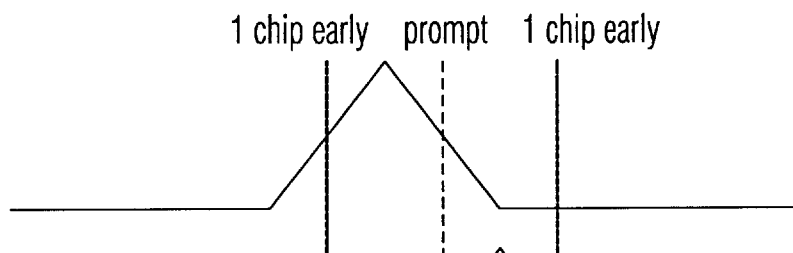
FIG. 4A illustrates a correlation function as the ½ chip early code shown in FIG. 3B is slewed past the received PRN code shown in FIG. 3A.
Figure 4B:
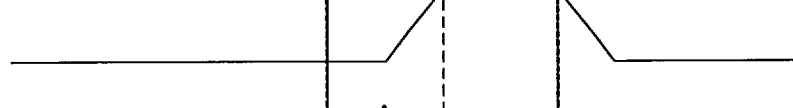
FIG. 4B illustrates a correlation function as the ½ chip late code shown in FIG. 3C is slewed past the received code PRN shown in FIG. 3B.

Conceptually, when the early pattern depicted in FIG. 3B is multiplied with the I signal 114, during the coherent mode, or multiplied by the I 114 and Q 115 signals and added together, during the non-coherent mode, this step results in a correlation function product, which is one specific value of an early correlation function curve depicted in FIG. 4A. In other words, as the timing of the C/A code generator 116 is adjusted, the early correlation function product can take any value on the correlation function curve shown in FIG. 4A. Similarly, FIG. 4B shows a late correlation function curve generated when the late pattern depicted in FIG. 3C is multiplied by the I 114 and Q 115. The above described two correlation function curves, depicted in FIGS. 4A and 4B, are then differenced to generate a discriminator function 401 shown in FIG. 4C. The discriminator function 401 takes a positive value if the locally generated PRN signal is within 1.5 chip on the early side of the received PRN code signal and takes a negative value if the locally generated PRN signal is within 1.5 chips on the late side of the received PRN code signal. Thus, once the locally generated PRN code signal is brought within an approximate alignment with the received PRN code signal, the locally generated PRN signal can be adjusted based on the discriminator function 401. More specifically, when the discriminator function 401 takes a negative value, the locally generated PRN signal is advanced. When the discriminator function 401 takes a positive value, the locally generated PRN signal is delayed. This process adjusts the timing of the C/A mode generator 116 and closes the DLL by driving the discriminator function 401 to a zero value.

A simpler process is implemented in the typical DLL depicted in FIG. 1. More specifically, rather than separately forming the early and late patterns as shown in FIG. 3B and FIG. 3C, a discriminator pattern FIG. 3D is formed by differencing the late code pattern, FIG. 3C, from the early code pattern, FIG. 3B. When this discriminator pattern is multiplied with the I signal 114, during the coherent mode, or by the I 114 and Q 115 signals and added together, during the non-coherent mode, the discriminator function 401 is obtained directly. This discriminator function 401 is then used as described above to close the typical DLL by aligning the locally generated PRN code signal with the received PRN code signal.

Figure 4C:
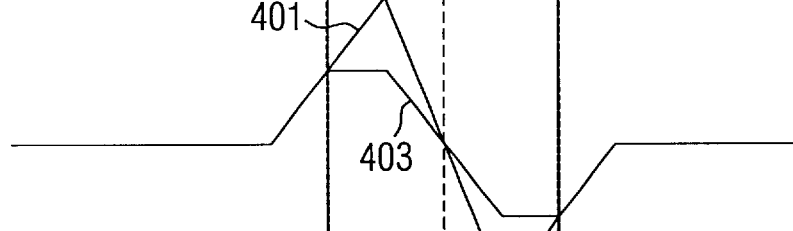
FIG. 4C shows two discriminator function curves generated by a conventional method and another by the present invention.
Figure 4D:
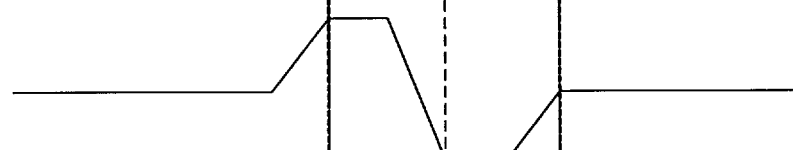
FIG. 4D illustrates a correlation function obtained as the Mode 1 early ½ bin pattern of FIG. 3I is slewed past the received PRN code of FIG. 3A.
Figure 4E:
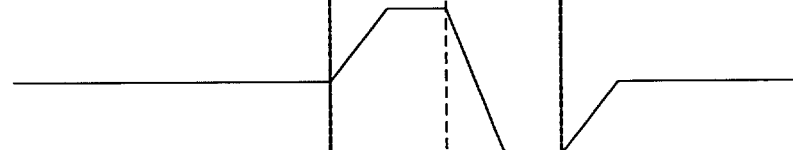
FIG. 4E illustrates a correlation function obtained as the modified Mode 1 late ½ bin pattern of FIG. 3J is slewed past the received PRN code of FIG. 3A.

The above description illustrated a discriminator function with a one chip spacing between its early and late patterns. A one-half chip spacing is obtained if a ¼ chip late pattern is subtracted from a ¼ chip early pattern. For the one-half chip spacing discriminator function, the illustrations in FIG. 3A through FIG. 3E are replaced by the illustrations in FIG. 5A through 5E, respectively. Further, the correlation and discriminator functions illustrated in FIG. 4A through 4C are replaced by the correlation and discriminator functions illustrated in 6A through 6C, respectively. The above described one chip correlator spacing (½ chip early minus ½ chip late) and one-half chip correlator spacing (¼ chip early minus ¼ chip late) can easily be generalized for any chip spacing.

Figure 2A:
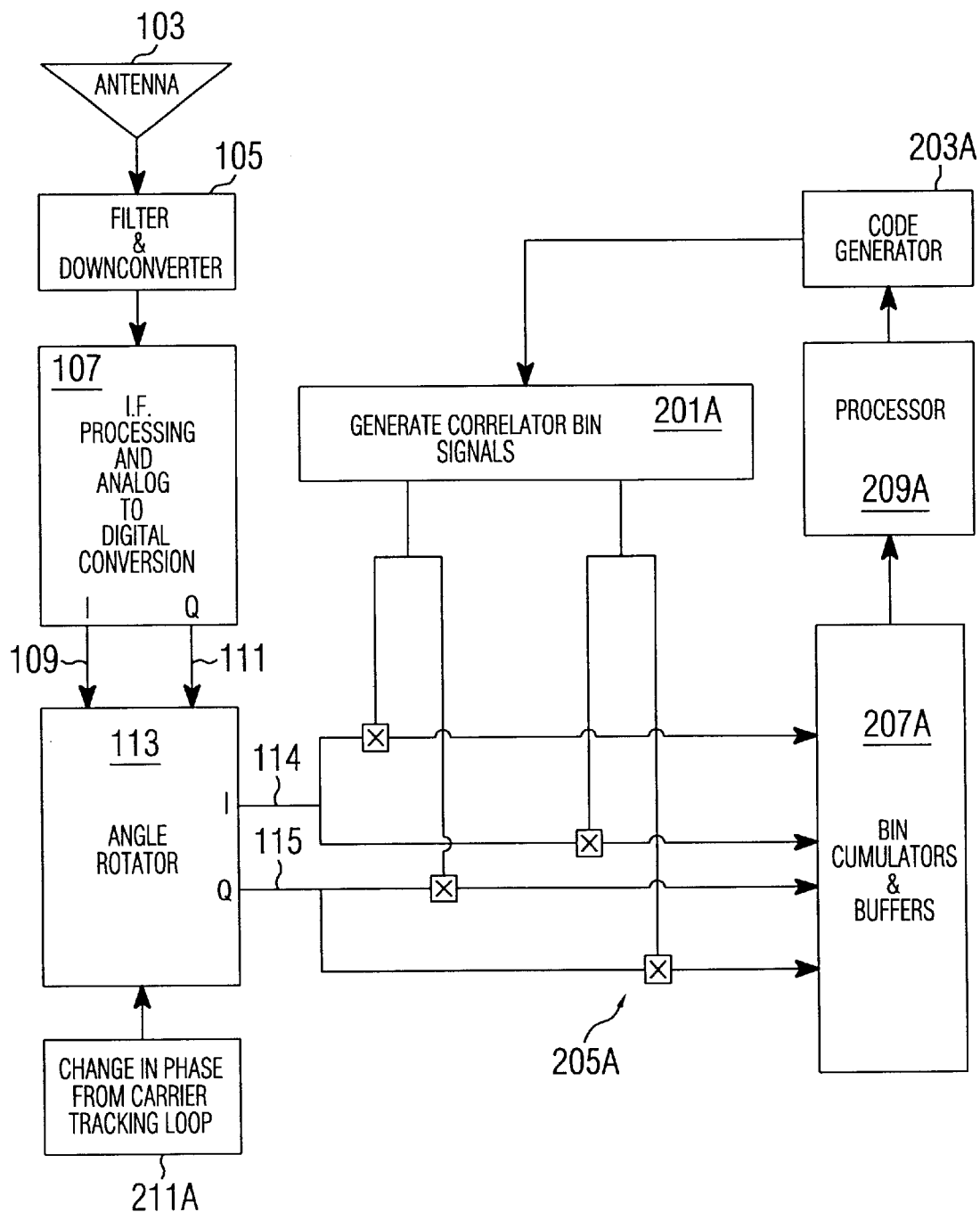
FIG. 2A illustrates a GPS receiver of the present invention that processes a pair of bin patterns.

Referring now to FIG. 2A, a preferred embodiment of the present invention is illustrated therein. In addition to the downconverters 105, 107 and the angle rotator 113, each channel circuitry of the present invention includes a local PRN code generator 203A configured to generate a local PRN code signal. The DLL of the present invention also includes a bin pattern generator 201A configured to generate a pair of time gated patterns, bin gated patterns based on the locally generated PRN code signal received from the code generator 203A. The nature of the bin gated patterns will be discussed later. The bin gated patterns are then supplied to a number of correlators 205A to multiply the respective bin gated patterns with the I 114 and Q 115 signals resulting in correlation function products. The correlation function products are accumulated and stored in a bin cumulator/buffer 207A. The DLL of the present invention also includes a processor 209A configured to further process the stored correlation products. In one embodiment, the processor 209A controls the local PRN code generator 203A based on the stored correlation products, and the processor can be further configured to monitor distortions in the received broadcast signals. In a preferred embodiment the local code generator 203A is a C/A code signal generator for tracking the C/A code signal of the broadcast signal. In an alternative embodiment, the local code generator 203A is a P code signal generator for tracking P code signal of the broadcast signal. In yet another embodiment, two DLLs can be provided to each channel circuitry with respective C/A code signal generators and P code signal generators. Further, DLL configurations having different number of bin patterns and corresponding correlators are depicted in FIG. 2B and FIG. 2D.

Referring back to FIG. 2A, in this embodiment the correlator bin signal generator 201A includes two bins and four correlators 205A. Each chip of the locally generated PRN code signal is divided into two intervals, and each bin is associated with one of the intervals. First and second bin gated patterns are generated based on the values of the locally generated PRN code signal during its first and second half chips. More specifically, during the first ½ interval of a chip, the first bin gated pattern takes a positive value if the value of the associated PRN chip is a positive value and a negative value if the value of associated PRN chip is a negative value. Conversely, the second ½ interval of a chip, the first bin gated pattern takes a zero value. In addition, the second bin gated pattern takes a zero value during the first ½ interval of a chip, and, during the second half chip, the second bin gated pattern takes a positive value if the associated PRN chip is positive and takes a negative value if the associated PRN chip is a negative value.

Figure 4F:
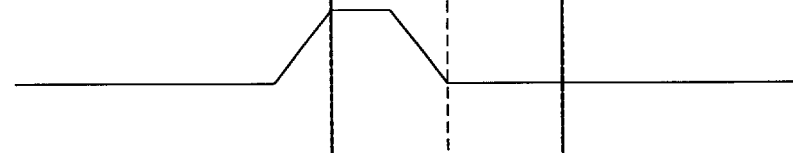
FIG. 4F illustrates a correlation function obtained as the Mode 2 early ½ bin shown in FIG. 3F is slewed past the received PRN code shown in FIG. 3A.
Figure 4G:
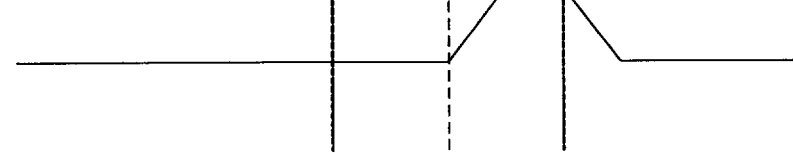
FIG. 4G illustrates a correlation pattern obtained as the Mode 2 late ½ bin shown in FIG. 3G is slewed past the received PRN code shown in FIG. 3A.

Exemplary first and second bin gated patterns are illustrated in FIG. 3F and FIG. 3G, respectively. By multiplying the bin gated patterns illustrated in FIG. 3F and FIG. 3G with the received PRN code signal, i.e., I 114 and Q 115 signals, the correlators 205A yield first and second bin correlator functions illustrated in FIG. 4F and FIG. 4G, respectively. In one embodiment, the second bin gated pattern can be subtracted from the first bin gated pattern which results in a discriminator pattern illustrated for 2 bins in FIG. 3H and a discriminator function 403 shown FIG. 4C. It is apparent that the discriminator function 403 of this embodiment is substantially similar to that of the typical DLL described above. In other words, the discriminator function 403 of this embodiment can be used to close the DLL similar to the discriminator function 401 of the typical DLL was used in closing the typical DLL. More specifically, the processor 209A adjusts the timing of the local code generator 203A based on the discriminator function 403. This causes the DLL of the present invention to be closed when the discriminator function 403 is driven to zero.

Figure 2B:
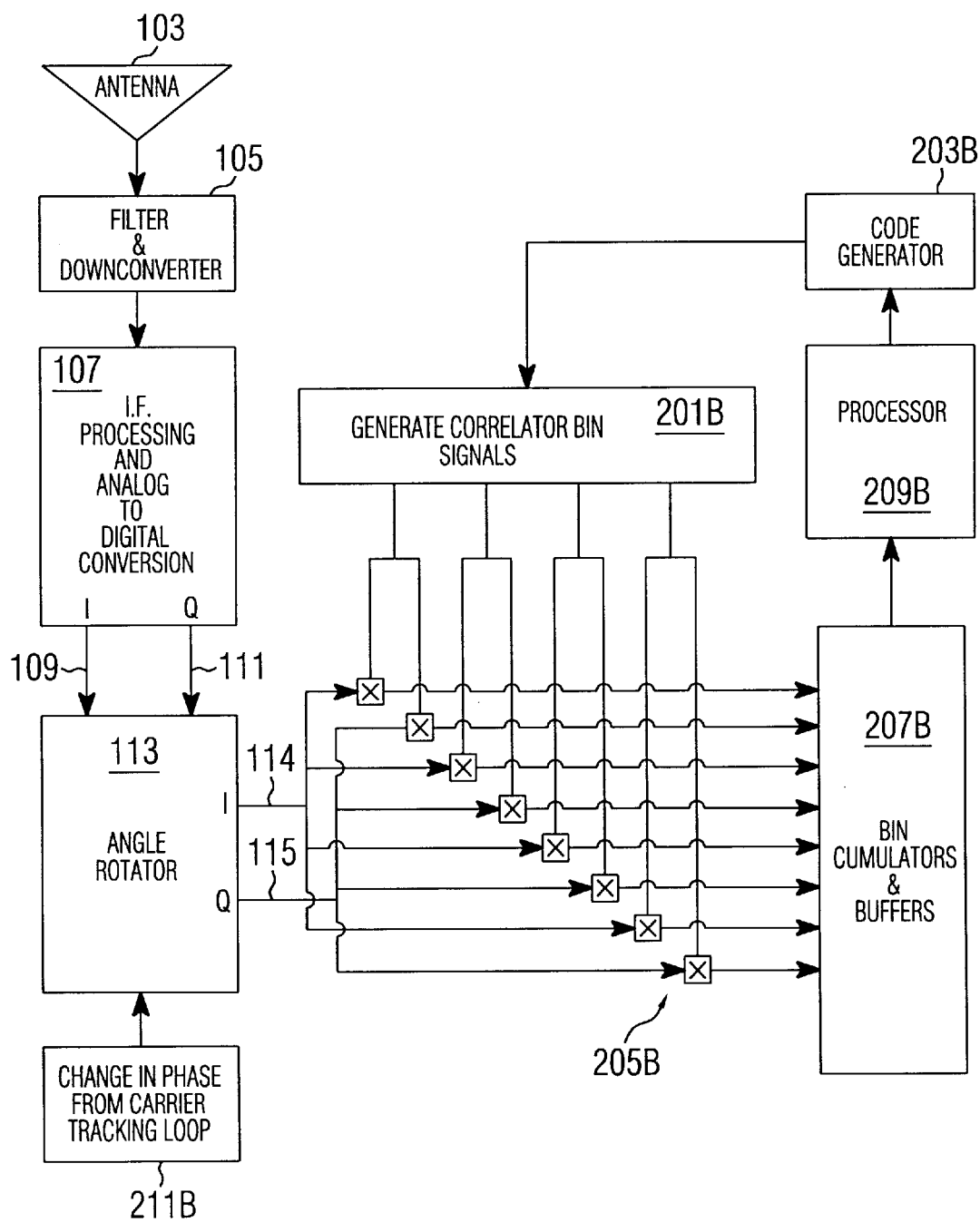
FIG. 2B illustrates a GPS receiver of the present invention that processes four bin patterns.

In the embodiment depicted in FIG. 2B, the correlator bin signal generator 201B includes 4 bins. In this embodiment, values to its bin gated patterns are assigned in a similar manner as that of the embodiment having 2 bins described above. For example, bin gated pattern values are assigned according to the values of the locally generated PRN code signal during its first, second, third and fourth quarter intervals of a chip. More specifically, during the first ¼ interval of a chip, the first bin gated pattern takes a positive value if the value of the associated PRN chip is a positive value and a negative value if the value of associated PRN chip is a negative value. During the rest of the chip, the first bin gated pattern takes a zero value.

Exemplary first and fourth bin patterns are illustrated in FIG. 5F and FIG. 5G, respectively. A discriminator function 603 in FIG. 6C can also be obtained by multiplying the bin gated patterns illustrated in FIG. 5F and FIG. 5G with the received PRN code signal, i.e., I 114 and Q 115 signals. This yields the first and fourth bin correlator functions illustrated in FIG. 6F and FIG. 6G, respectively. In one embodiment, the fourth bin gated pattern can be subtracted from the first bin gated pattern which results in a discriminator pattern illustrated for 4 bins in FIG. 5H and a discriminator function 603 shown FIG. 6C. Once again this discriminator function 603 can be used by the processor 209B to close the code tracking loop by driving the discriminator function to zero.

It should be noted that the resultant discriminator functions in the above described embodiments of the present invention are not identical to that obtained from the various typical early minus late discriminator patterns. In other words, the function curves 401 in FIG. 4C and 601 in FIG. 6C differ from the function curves 403 and 603, respectively. This difference arises because the discriminator patterns of the typical DLL described above (e.g., see FIG. 3D) remain at zero if the respective PRN code signal does not make a transition at a corresponding transition point. The transition point is the starting/ending point of each chip. However, the bin gated patterns (e.g., see FIG. 3H) of the present invention described above take non-zero values for portions of each chip whether or not there was a PRN code transition.

Figure 2C:
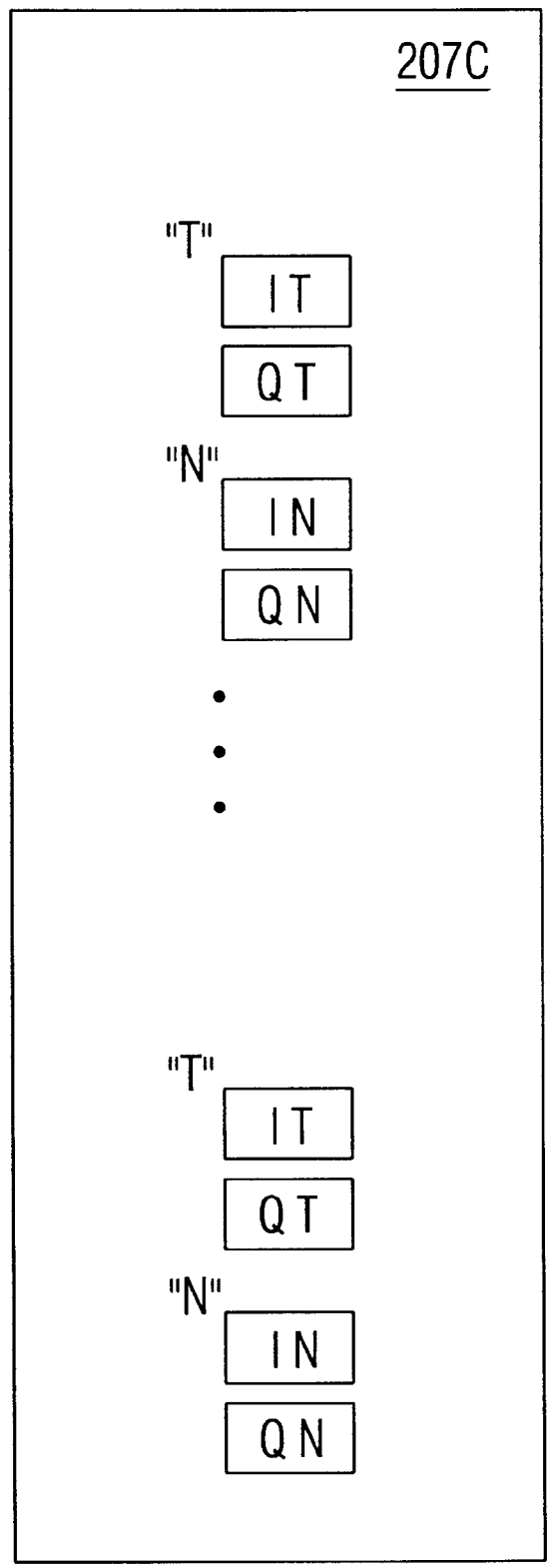
FIG. 2C illustrates a memory device of the present invention configured to store "N" and "T" product values.
Figure 2D:
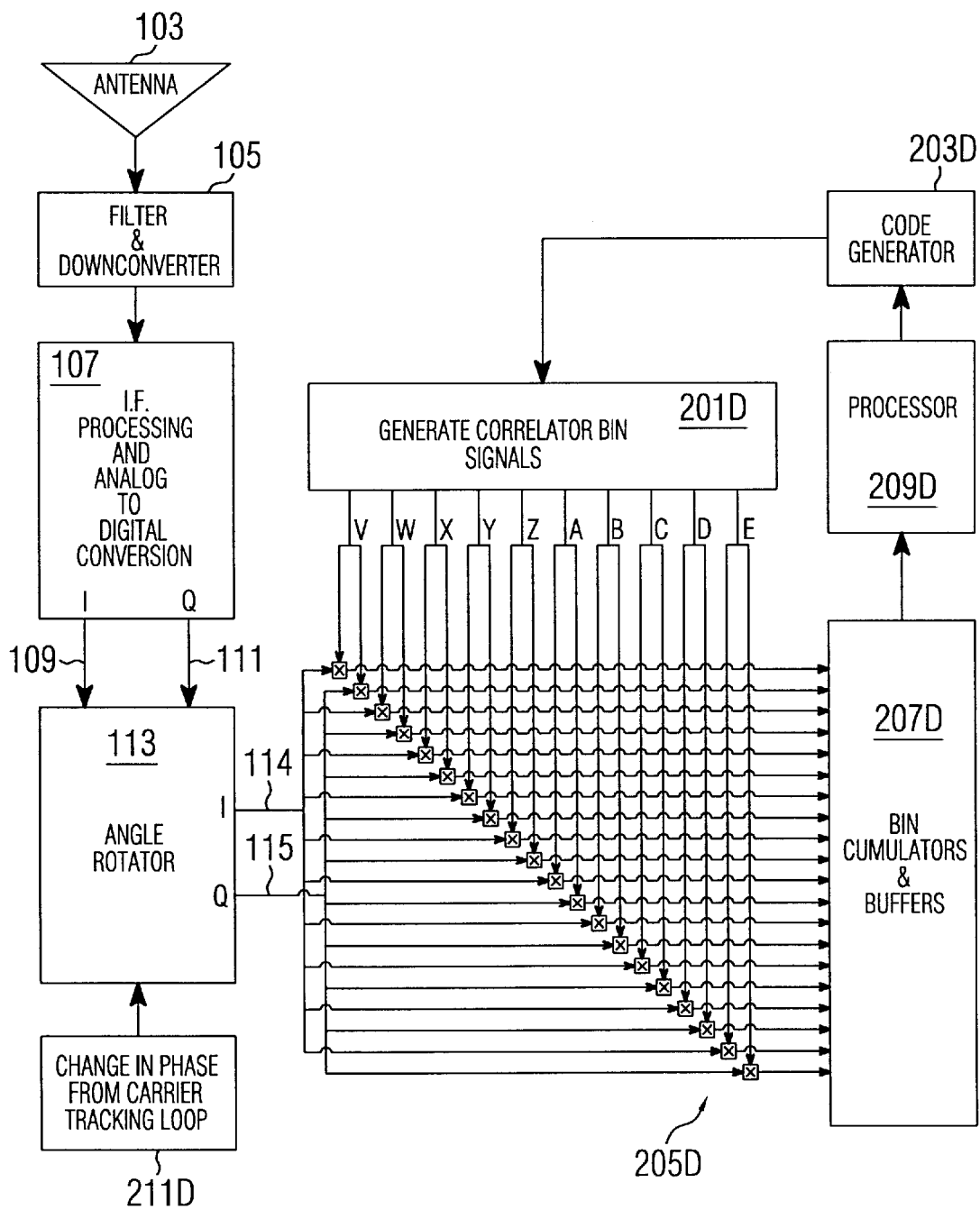
FIG. 2D illustrates a GPS receiver of the present invention that processes ten bin patterns.

Therefore, in one preferred embodiment of the present invention, both of the above described function curves can be obtained by providing "T" and "N" bin patterns and product memory spaces as depicted by the bin cumulator/buffer 207C in FIG. 2C. More specifically, the "T" product is stored whenever the associated PRN code makes a transition at a transition point, and the "N" product is stored whenever the associated PRN code does not have a transition at the transition point. Whether there is a transition in the PRN code can be communicated to the bin cumulator/buffer 207C from the correlation bin signal generator 201 A, B or D. Further, the correlation bin signal generator 201 A, B or D can be modified to generate two sets of bin gated patterns, i.e., "T" and "N" patterns. In this embodiment, twice the number of correlators are required in order to multiply the "T" and "N" bin gated patterns with the received PRN signals. It should be noted that the bin cumulator/buffer 207C can replace any of the bin cumulator/buffers 207A, B or D.

By utilizing the above structure, the present invention can provide three different modes of operation. Mode 1 operation simply uses the "T" products to form appropriate discriminator functions. Mode 2 operation adds the "T" products and corresponding "N" products before forming discriminator functions. A third mode of operation, Mode 3, can also be formed by subtracting the "T" products from corresponding "N" products before forming discriminator functions. In the Mode 1 operation the bin patterns remain zero when there is no PRN code transition. In other words, in the Mode 1 operation, the resulting bin patterns are identical to the bin patterns described in connection with the typical DLL except that they remain zero during any chip interval which does not make a transition. In Mode 2 operation, a non-zero value is assigned to the bin even when there is no transition of the PRN code. This generates the bin pattern described above in connection with embodiments having 2 and 4 bins.

Now referring to FIG. 2D, a correlator bin signal generator 201D configured to generate 10 bin gated patterns is illustrated. The 10 bin patterns are labeled "V" through "Z" for the bins which precede the transition point and labeled "A" through "E" for the bins which follow the transition point. Thus, bin "Z" represents the last bin before the associated transition point occurs, and bin "A" represents the first bin after the associated transition occurs. The "A" bin pattern would consist of a +1 for the first $\frac{1}{10}^{th}$ interval of a chip following the associated PRN chip transition from a +1 to a −1 and would be −1 for the first $\frac{1}{10}^{th}$ interval of a chip following the associated PRN chip transition from a −1 to a +1 (for the "T" bin pattern). At all other times the "A" bin pattern would have a value of zero. The "B," "C," "D," and "E" bin patterns are substantially identical with the "A" bin pattern except that they are each delayed by an additional $\frac{1}{10}^{th}$ interval of a chip compared to its preceding bin. The "Z" bin pattern is substantially identical to the "A" bin pattern except that it precedes the chip transition. The "V," "W", "X" and "Y" bin patterns are substantially identical with the "Z" bin pattern except that they are each advanced by an additional $\frac{1}{10}^{th}$ interval of a chip compared to the prior bin.

Referring to FIG. 7, there are shown products of the received PRN code signal, i.e., I (and Q in the non-coherent mode) with the bin patterns described above ("T," i.e., transitions only or Mode 1 operation) as the bin patterns are slewed, i.e., time adjusted, together with respect to the received PRN code signal. When the sum of bin products Z and A is calculated, a resulting discriminator function, shown in FIG. 7G, is substantially identical with that of the typical DLL correlator, discussed above in connection with FIGS. 3A–3J and 4A–4G, having a 0.2 chip spacing. Also, by adding an additional bin at each end, discriminator functions corresponding to successively wider correlator spacings are obtained. Thus, with 10 bins spaced equally between ½ chip in front to ½ chip behind the transition it is possible to form the equivalent of 10 different discriminator functions with correlator spacing from 0.2 to 1.0 chips in steps of 0.2 chip spacings. Further, when all the bin products, V through E, are added together, the resulting discriminator function is as shown in FIG. 7F. In addition, other combinations of bin products can be formed with discriminator functions which are less sensitive to multipath effects. FIG. 7H, which will be discussed later, shows one such discriminator function formed from four bin products requiring only four bin patterns.

Further, by increasing the bins per chip to 20 from the 10, it would be possible to monitor the discriminator functions of all possible correlator spacings in 0.1 chip steps. In another embodiment having 40 bins per chip, the discriminator functions corresponding to 0.05 correlator spacings could be simultaneously monitored. In yet another alternative embodiment, the correlator spacing is not uniform but a variable. In other words, the bins near the transition point, such as the "Y," "Z," "A" and "B" bins may have shorter interval spacings than those of "V," "W" and "D" and "E" bins. This alternative embodiment provides more resolution and accuracy at the transition points. For instance, for the 10 bin per chip depicted in FIG. 7, the "Y," "Z," "A" and "B" bins may have 0.05 chip intervals while "V," "W," "D," and "E" bins have 0.15 chip intervals. In yet another embodiment, each bin pattern may have different bin interval sizes. For instances, the bins near to the transition point may have shorter intervals compared with the bin patterns further spaced apart from the transition point.

As shown above, the number of bins can be any arbitrary number, and it is only limited by availability of hardware components. However, the number of bin functions is preferably limited in relationship with the GPS receiver and its corresponding satellite broadcast signal bandwidth. The satellite bandwidth is required to be from 24 MHZ to 30 MHZ. Since the C/A chip rate is approximately 1 MHZ, this means that sampling at more than 30 times per chip causes the samples to be correlated and contain lower amounts of information. Hence, a correlation process equivalent to 40 bins per C/A chip can be implemented. This represents the higher end of the practical range. Ten bins per C/A chip embodiment represents the lower end and would generally be associated with receiver bandwidth implementations of less than 10 MHZ. In an alternative embodiment, the bins may not cover the entire chip. For instance, a chip period can be divided into 10 bin gate periods and only 4 bins can be actually generated. In another embodiment, bin gated patterns of equidistance from the transition point (e.g., "A" and "Z" bin patterns or "B" and "Y" bin patterns in FIG. 7) can be added before they are inputted into the correlators. In this embodiment, the number of required correlators is reduced by factor of two.

The above mentioned discriminator function illustrated in FIG. 7H, which is formed by summing bins Z and A and subtracting bins Y and B, exhibits some sensitivity to multipath delays of about one chip. This sensitivity to multipath delays can be reduced at the expense of some additional noise. However, since multipath delays represent a systematic error and since noise effects can be largely eliminated by longer averaging times, it becomes beneficial, particularly in P code implementations where the one chip multipath is shorter compared with that of the C/A code implementations, to consider alternate designs for minimizing this multipath sensitivity.

Therefore, in one preferred embodiment, the Mode 2 operation is utilized rather than the Mode 1 operation. More specifically, multiplying the received PRN code signal, i.e., incoming I (and Q for non-coherent mode), and the 10 bins per chip of the above described embodiment generates the 10 bin products shown in FIG. 7V through 7E when the bin patterns are assigned values only for PRN code chips at which transitions occurred. If the bin patterns are also assigned a value of +1 (for the appropriate $1/10^{th}$ interval) when the PRN code remains at +1 with no transition and assigned a value of −1 (for the appropriate $1/10^{th}$ interval) when the PRN code remains at −1 with no transition, the products become as depicted in FIGS. 8Y through 8K as the group of bin patterns is slewed past the received PRN code signal. Note the number of bin patterns has increased while the corresponding bin pattern width remained the same (at $1/10^{th}$ chip) because the correlation of the bin product has become narrower. Thus, it takes more bins to completely characterize the possible discriminator functions. As before, 10 product bins, see FIG. 8L, can be used to generate a composite 1 chip spacing correlator. However, the composite discriminator function so defined does not reach as far as the corresponding Mode 1 function shown in FIG. 7F. Similarly the equivalent of a narrow correlator spacing shown in FIG. 8M can be formed. Finally, a discriminator function can be formed from the product bins which is substantially insensitive to multipath, FIG. 8N, and in this case it is no longer sensitive to multipath with a one chip delay. (The extra sensitivity to one-chip earlier signal cannot cause a multipath effect since all multipath errors involve a delay.)

It should be noted that useful information is obtained by retaining the Q channel bin products as well. While the product of the individual bins with the Q digital stream has an average value of zero across all bins, the individual product bins can vary due to multipath effects and provide information regarding a particular multipath delayed signal. Thus, the embodiment having 40 bin products with the I channel and 40 bin products with the Q channel is desired as well. In addition, the information distinguishing the Mode 1 and Mode 2 operation is of use. In the Mode 1 operation the bin patterns take non-zero values only when the PRN code undergoes a transition. In the Mode 2 operation the bin patterns take non-zero values during every chip whether or not a transition occurs. The information from both modes can be retained if a separate product is formed for each bin as shown in FIG. 2C. One product will contain the result of all bins in which a transition occurs (the "T" product) and a second product will contain the result of all bins in which a transition does not occur (the "N" product). Therefore, in the embodiment with forty bins, 160 bin products per channel can be found: 40 product bins of type "IT" (in-phase transitions); 40 product bins of type "IN" (in-phase non-transitions); 40 product bins of type "QT" (quadrature-phase transitions); and 40 product bins of type "QN" (quadrature-phase non-transitions). This information can be used effectively to solve and remove most multipath effects from both the code measurements and the carrier phase measurements.

Figure 9:
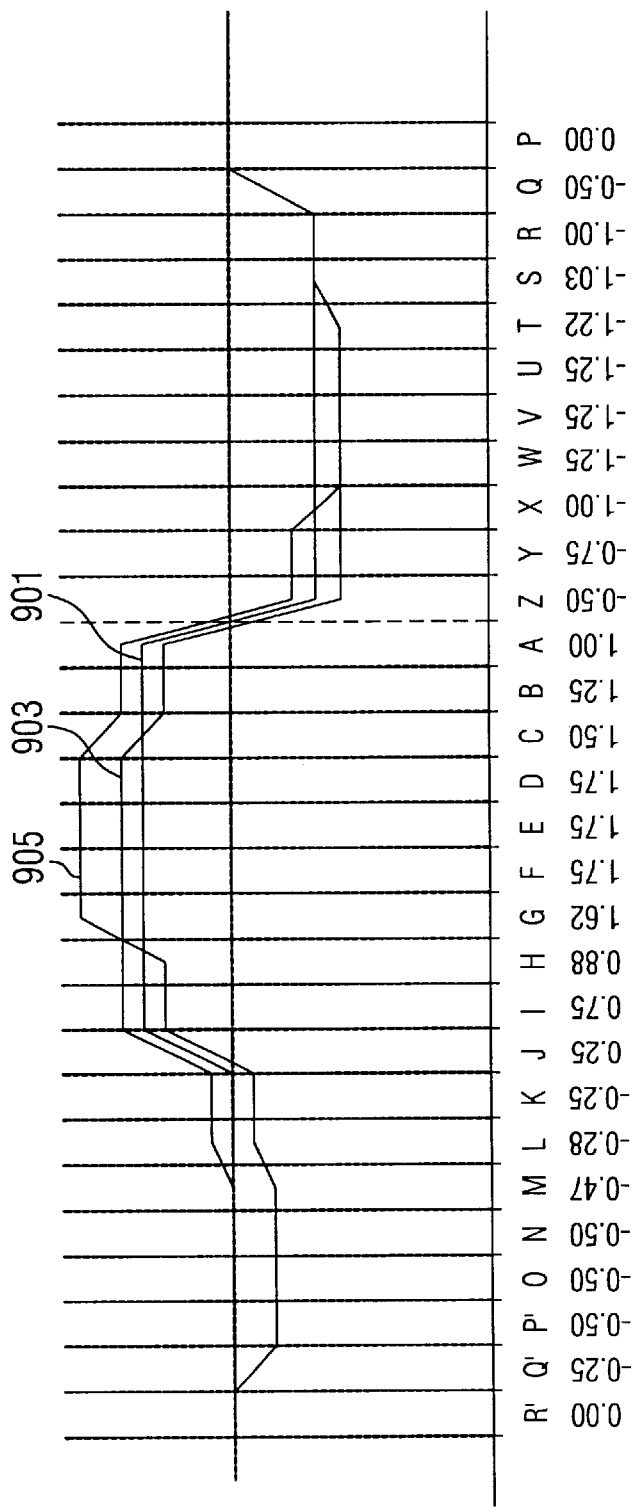
FIG. 9 illustrates the effect of multipath upon a Mode 1 implementation which is tracking the received PRN code signal.

In particular, FIG. 9 shows an example of the measurements from an "IT" product in the presence of two large multipath reflectors. In this example only 10 bins are assumed per chip; however, more than 10 bins are illustrated because more than one chip is of interest. The curvilinear line 901 in FIG. 9 shows the correlation product when multipath is not present. It corresponds to the measurements obtained for the separate bin patterns shown in FIG. 7V through 7E when the PRN code is aligned with the incoming signal, i.e., at the dashed line in the middle of FIG. 7. In the example of FIG. 9, a multipath signal of ¼ the direct signal strength is assumed to be arriving 0.25 chips late but in-phase with the direct signal as illustrated by curvilinear line 903. Finally, even a larger multipath signal at ½ the direct signal strength is assumed to be arriving 0.7 chips late and directly out-of-phase (so that it subtracts) as illustrated by curvilineal line 905. Under these conditions the measurements read by the associated "IT" bins are shown just below the figure. In this example there is no additional information in the "QT" bins. When the multipath is other than perfectly in-phase or perfectly out-of-phase, the information contained in the "QT" bins would display the associated information. The effect of different discriminator functions constructed from the bin products is also described in the figure.

Figure 10:
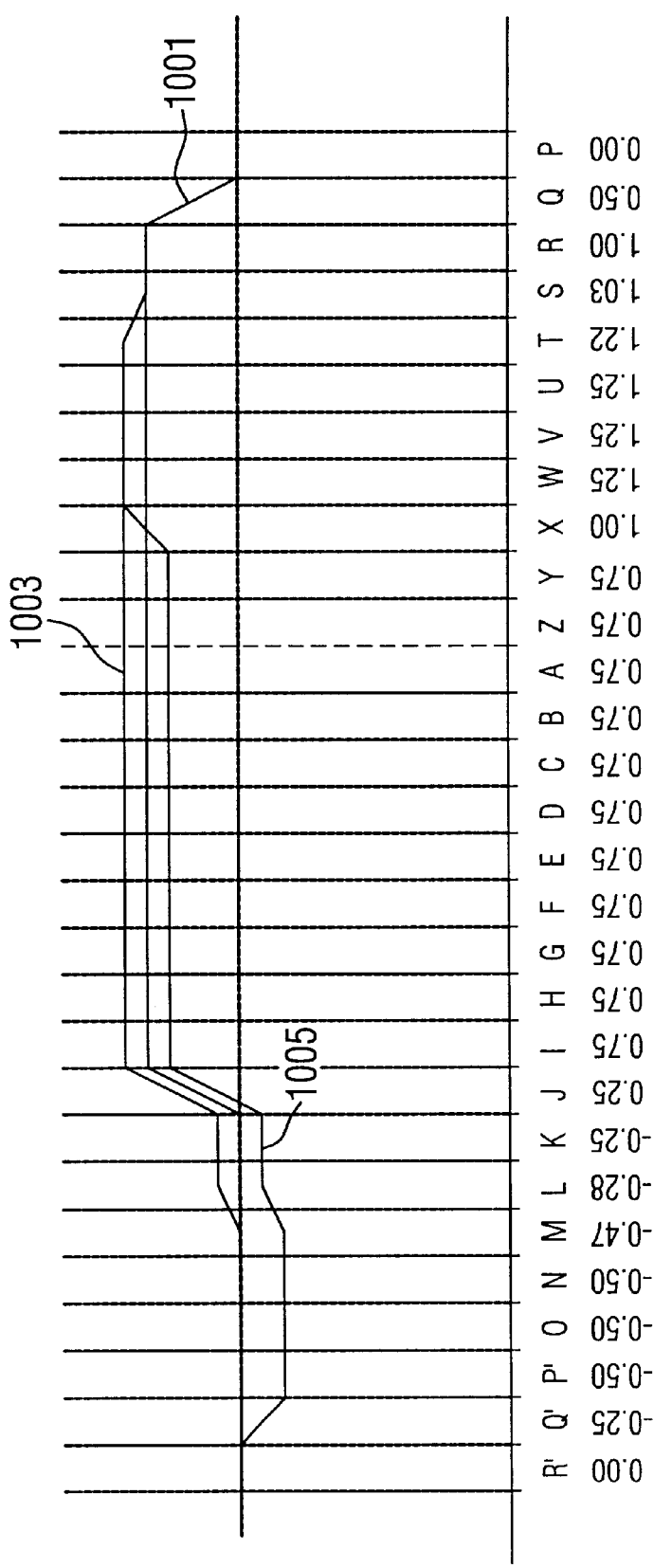
FIG. 10 illustrates the effect of multipath upon bins which are enabled during a non-transition chip interval.

FIG. 10 shows an example of measurements from an "IN" product in the presence of two large multipath reflectors. It is generally thought that no information is obtained from bin products where no transitions occur. FIG. 10 shows that this is clearly not the case. Information is present because of the approximate 50% probable transitions at the prior chip. The situation illustrated is the same as that of FIG. 9, with the same two multipath signals assumed. Curvilineal line 1001 shows the profile of the bin products when there is no multipath; curvilinear line 1003 after one multipath signal is added; and curvilineal line 1005 after two multipath signals are added. Also as before, because the multipath is directly in-phase or directly out-of-phase, there is no additional information contained in the "QN" bins. It is noted that prior to the transition the same information is present in the "IT" and the "IN" product bins simply of opposite sign. This is because both are looking at the 50% probable prior transitions. However, following the transition point the useful information differs. For example, at product bin "B" the average of the "IN" and "IT" values gives a multipath free value and one-half the difference gives the magnitude of the composite multipath. With the use of the "QT" and "QN" values at the same point the multipath magnitude and phase can be determined and the corrected multipath free signal as well. Thus, both the code and the carrier phase measurements can be corrected for the multipath signal presence.

Figure 11:
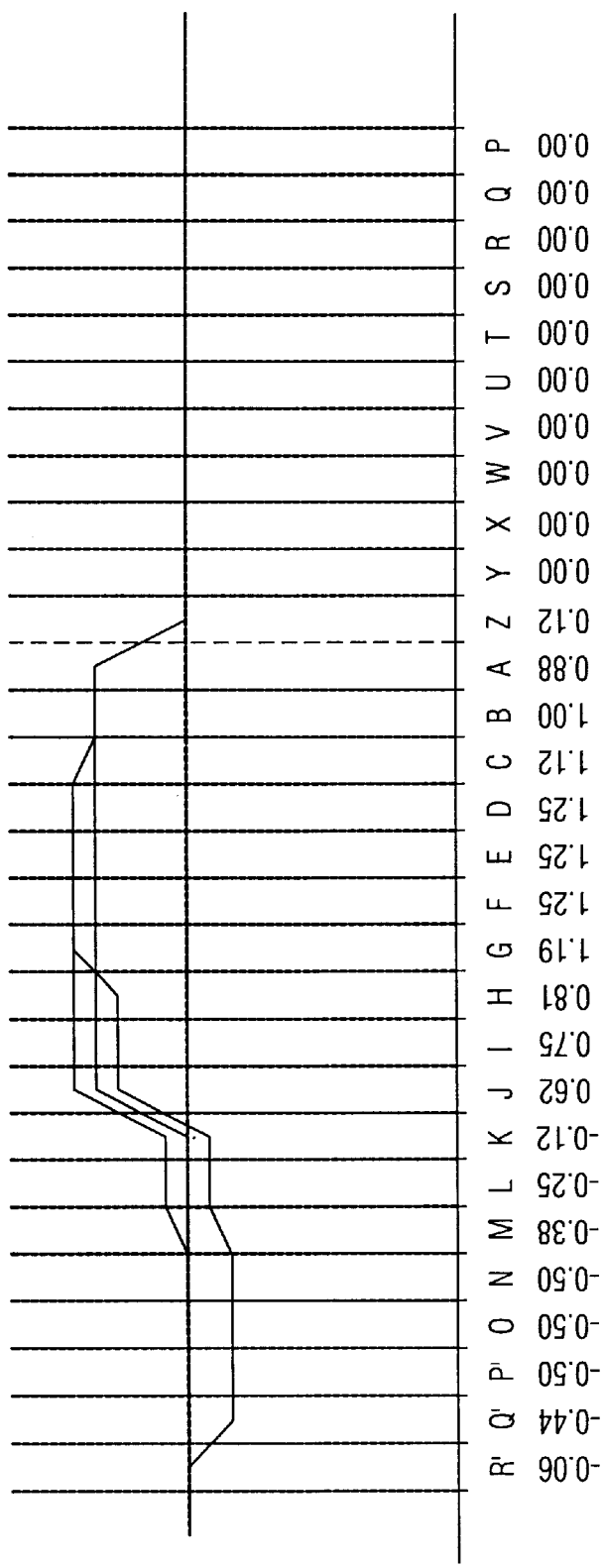
FIG. 11 illustrates the effect of multipath upon a Mode 2 implementation which is tracking the received PRN code signal at both transitions and non-transitions.

FIG. 11 shows the result of averaging the "IT" and "IN" bins which is substantially identical to the Mode 2 operation. It shows as above that the early multipath is canceled by this averaging process. However, if the information is combined into a single bin then the useful information has been lost as to the amplitude and phase of the multipath. With an extended measurement of product bin information for both the in-phase and quadrature components and for transitions and non-transitions, it is possible to characterize the multipath distortion and remove it from the direct signal information. The information as to the multipath amplitude and phase is directly embedded within the bin products as described. Each bin can be characterized as to the components of signal and multipath which it contains and with fairly simple logic the multipath and signal can be separately determined. This process is much simpler and more straight forward than the nonlinear solution process described in the Richard D. J. van Nee and Jaap Sierveld, article "The Multipath Estimating Delay Lock Loop: Approaching Theoretical Accuracy Limits," in *IEEE Position Location and Navigation Symposium Proceedings,* 1994," pages 246 to 251. Part of the simplicity of the procedure of the present invention is that any given multipath component affects groups of adjacent bins equally and linearly rather than in the nonlinear dependance upon the discriminator function as exploited by van Nee and Sierveld.

Therefore, the above described preferred embodiments provide new capabilities for solving and removing multipath effects from the received signal. For instance, it has been noted that the equivalent of the "Z+A−Y−B" discriminator function as implemented in hardware was sensitive to the multipath effects with about a one-chip delay. Indeed all discriminator functions using components near this chip transition are sensitive to the multipath effects with about a one-chip delay. It is easy to see that adding such a multipath component to FIG. 9 would create some code tracking distortion. In fact, the non-transitions can also be included with the transitions in defining the discriminator functions. This results in product bins as shown in FIG. 11 where it is apparent that any one-chip multipath delay would not affect the results. In one embodiment, the tracking bins are moved one chip farther forward (in FIG. 9) and its sign is reversed to track the initial falling edge (formed from −Q−P+R+O). This scheme could be implemented directly in hardware or software to make use of the product bins in accord with the present invention. This embodiment accomplishes the purpose of reducing the multipath sensitivity; however, it is slightly less optimal in that only about half the transitions are observed. In a similar fashion, the rising edge of the non-transition correlation pattern in FIG. 10 can also be used to reduce the multipath sensitivity and be implemented directly in hardware or software. But it also suffers the same drawback that only about half of the transitions contribute to the discriminator function.

In another embodiment, the Mode 2 operation, in which the "IN" bins and the "IT" bins are added together, can achieve the product bin measurements, as shown in FIG. 11. This embodiment has a specific disadvantage not generally recognized. For instance, some of the C/A codes are not well balanced between equal numbers of transitions and non-transitions. As a result, rather than product bins "Y" through "P" in FIG. 11 being zero, a significant positive or negative correlation can remain. This can allow significant multipath distortion to remain on broadcasted signals received from those satellites with the unbalanced codes. In addition, the slope of the rising edge of the discriminator function is affected by the lack of balance and the tracking point can thereby be affected.

An improved correlation curve without any adverse features can be obtained by using the Mode 3 operation. Specifically, in Mode 3 the "IN" bins are subtracted from the "IT" bins. The result is the same product bin measurements shown in FIG. 11 except that the measurements are made in the bins shifted forward by one chip. In addition, since the leading portions of the two bin measurements are now added together, no exact cancellation is required to make the rising edge of the correlation pattern reliably detected. An example of a multipath reduction product bin combination would then be the combination of "Q+P−R−O." Such a combination is not sensitive to one-chip multipath delay and would use the information contributed by all transitions. The fact that the tracking point is one chip farther forward is not significant. It can be compensated for in either the hardware of software and even if it were not adjusted for it would simply cause the apparent receiver clock to be in error by a one-chip bias which then can be corrected in later processing.

As discussed above in connection with FIG. 9, the multipath effects as shown have affected the "IT" bin values at bin "Y" and bin "A" with a positive bias. Further, as illustrated above, the bin combination (Z+A−Y−B) forms the discriminator function by which the code tracking point is not affected. This same discriminator function will track the code correctly for the specific multipath delays illustrated even if they are not perfectly in phase or exactly 180 degrees out of phase. However, the same is not true for the carrier phase tracking. When a multipath delayed signal is exactly in phase or exactly 180 degrees out of phase, the QT and QN bins will remain at a zero value. But when the multipath delayed signal phase is, for example, at 90 degrees or at 270 degrees, the I bins will be almost unaffected and biases will affect the Q bins. However since the carrier loop drives the average value of the Q bins to zero (introducing multipath errors into the carrier tracking) the difference from the average value on each side of the code transition can provide information on the amount of carrier phase distortion due to the multipath effects. For example, if in FIG. 9 the multipath delayed signal was at zero degrees or at 270 degrees, then, instead of distorting the IT product bins as shown, the IT product bins would be little disturbed from the curvilineal line 901. Rather, the deviation from the curvilineal line 901 would appear as a deviation from zero in measurements of the QT product bins. But the change in the value from QT bin Y to QT bin B is independent of the multipath bias and represents twice the error due to the multipath. The specific phase error in the carrier tracking loop is in radians ½ (QT bin B−QT bin Y)/(IT bin Y−IT bin B). This is actually the value for the tangent of the phase error but since the multipath is a small distortion the approximation is valid.

Figure 12:
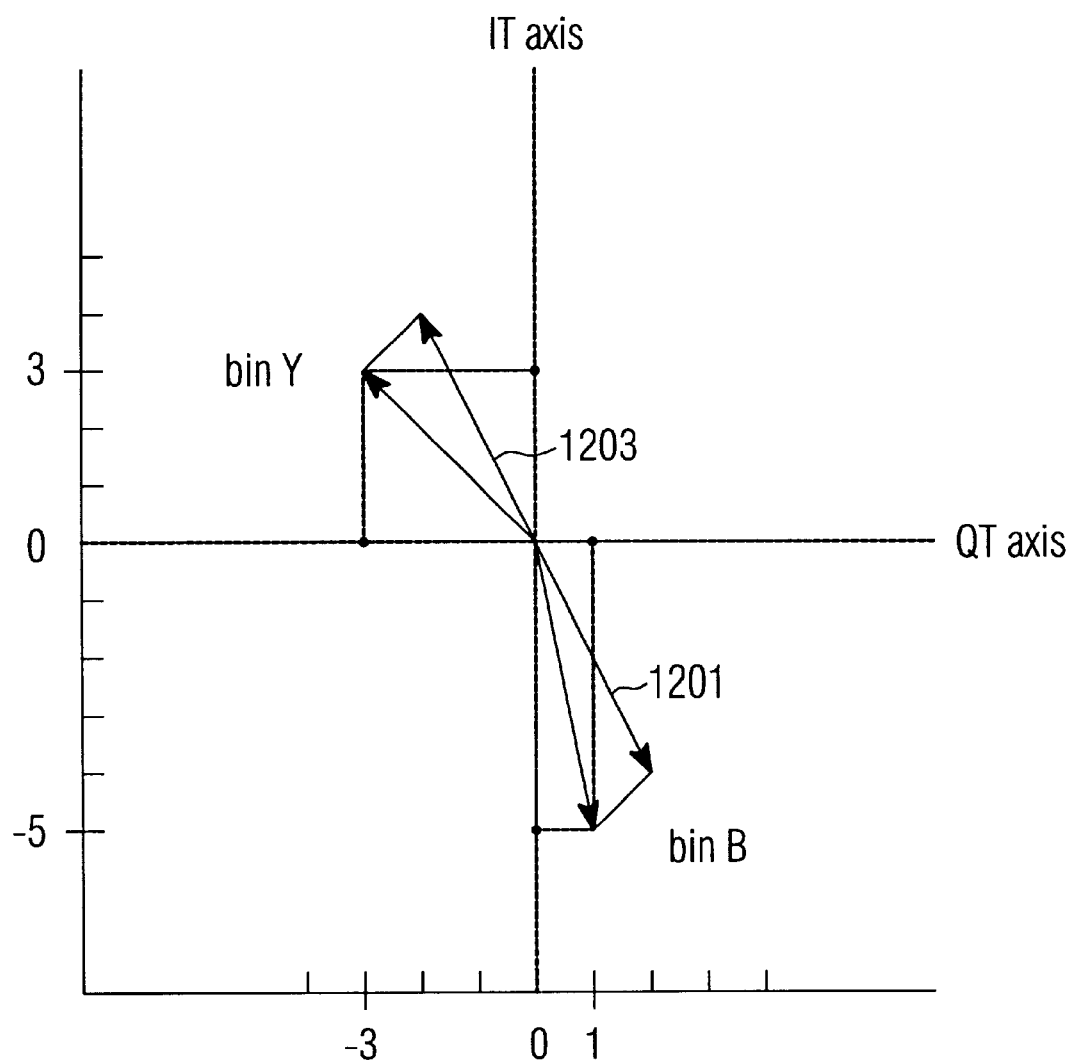
FIG. 12 illustrates the multipath phase error using bin Y and B functions.

To make the description clearer, a second example is illustrated in FIG. 12. The vector 1201 line pointing downward to the right with the arrow at the tip shows the vector which is defined by the QT bin B and IT bin B values if there were no multipath. The multipath in QT bin B is −1 unit and the multipath in IT bin B is −1 unit, i.e., the phase of the multipath is at −225 degrees and is the square root of 2 in amplitude. This multipath causes the actual vector represented by the QT and IT bin B values to be 1 and −5 respectively. Similarly, for bin Y after the transition the QT and IT values are disturbed by approximately the same multipath and the values represented by the QT and IT bin Y values become −3 and 3 respectively. As discussed above, the mean value of QT readings across all bins contained in one chip is zero because of the carrier loop closure. It is seen that in FIG. 12 the loop phase error given by the equation above is ½ (1−(−3))/(3−(−5)) which is 0.25 and that is the amount of correction needed to bring the vectors 1201, 1203 back into alignment with the IT axis. Thus, the average multipath distortion in the carrier phase loop can be computed and removed using the process described. It can be shown that very short multipath which starts before bin B would still remain uncorrected and, furthermore, any multipath which is delayed by almost one chip such that it starts after bin Y but before bin B would also remain uncorrected.

Similar carrier phase tracking errors could be measured using, rather than the value of QT bin Y, the sum QT bin Y+QN bin Y and, rather than the value of QT bin B, the sum QT bin B+QN bin B. This corresponds to the Q bin products during Mode 2 operation as illustrated for the I channel bins in FIG. 11. The advantage of this modified process is that it removes the near one chip delay multipath which starts after Bin Y and before bin B, since such multipath is common for both the QT and QN bins. Finally, even earlier bins can be used in similar fashion in Mode 3 operation where the differences in the QT and QN bins are used rather than the sum. It should be noted that for these carrier phase multipath correction schemes only a few Q channel bins may be needed. Only when the entire multipath measurements are required to be mapped out, all of the Q channel bins are needed to be retained. For the above described carrier phase tracking embodiments, the various combinations of products are either processed by the processor 209D of FIG. 2D first then sent to the carrier phase tracking loop or sent directly to the carrier phase tracking loop to be processed therein.

As discussed earlier, with carrier rate aiding to the code loop, the bandwidth of the code loop can be reduced to a fraction of one Hertz. This means that even though the narrow correlator spacing and the multipath reduction patterns inherently lose energy compared to the normal wide correlator spacing, long integration times can be used so that the lower signal energy does not represent a problem to the present invention.

The above described preferred embodiments also provide capabilities for monitoring satellite signal distortions. The optimum monitoring receiver includes the embodiment with 40 bins per chip, though the embodiment with only 20 bins per chip or even 10 bins per chip could be used. The bandwidth of the receiver should be the full 24 MHZ specified for the GPS satellites so that the entire characteristics of the satellites could be monitored. The hardware of the receiver includes built-in normal code and carrier tracking logic so that the carrier rate aiding is applied to the code loop and the bin logic is required to be processed at a rate no greater than once per second. In addition, the bin products are required to be multiplied only by the in-phase or 1 digital stream since the bin products need not be formed except in the coherent mode. Further, the Mode 1 operation is sufficient, with the products using non-zero bin values only when transitions occur. While discriminator functions could be formed corresponding to each correlator spacing in 0.05 chip steps, this would not be necessary. The individual bin values represent the derivative of the entire correlation function. Thus, it is sufficient to ensure that there is no satellite disturbance if the bin values are of constant amplitude (modified of course by the filter response at the transition where the derivative changes from positive to negative). In other alternative embodiments, a shape generated by K, K+J, K+J+I, . . . , K+J+I+ . . . +A+B+ . . . (adding all the bins) or a proportional difference between B, Y bins and A, Z bins can also be monitored to determine the distortion. From the above, a monitor receiver preferably includes a maximum of 40 bins per receiver channel to monitor satellites' C/A code transmission completely. As discussed above, in alternative embodiments, less than 40 bins per receiver channel can be provided.

It should be noted that when the discriminator function value is fed back to the hardware and used to adjust the timing of the PRN code and associated bin values, it automatically drives the discriminator function to zero on average. However, for those alternative discriminator functions being monitored but not used by the hardware to adjust the internal PRN code timing, it is preferable to scale the discriminator function values into the expected range or into the time error, i.e., the differerence between the PRN code and the incoming PRN code signals, by which it would adjust the timing of the PRN code as if it were fed back. Clearly, the discriminator function is scaled by the signal strength of the incoming signal. Thus, the first step in calibration of the discriminator function is to normalize it by the signal strength. The average value in the bin product is one good measure of the signal strength, though it is at least somewhat affected by multipath signals. Similarly the first few bin products just after a transition could be used as a measure of the signal strength and used to scale the discriminator functions formed from the bin products. An accurate calibration also requires knowledge of the rounding of the edges of the bin products due to receiver and satellite bandpass considerations. It is desirable to use an extra channel, when not all channels are in use, to perform calibration functions in real time. Thus, a calibration channel could be used to measure the actual time adjustment to the PRN code measurement which results from using a given discriminator function error value to close the loop and directly compare the measured value to the value obtained from the open loop estimate.

It should be noted that the processors depicted in FIGS. 2A, B, D, are preferably a programmable microprocessor. This allows the processor 209A, B, D to be programmed with various combinations of embodiments described above. In alternative embodiments, the processor can be implemented with a number of logic gates, Application Specific Integrated Circuits (ASIC's), or any other electronic circuits available to one of ordinary skill in the art. The bin cumulator/buffer 207A, B, C, D depicted in FIGS. 2A, B, C, D is preferably a storage medium configured to store cummulated outputs of the bin products. The storage medium is preferably magnetic, solid state and/or optical memory devices designed for efficient recording and fast access.

It should also be noted that even though the present invention has been described with embodiments that include even numbers of bins, an odd number of bins can be provided. In such embodiments, one of the bins preferably straddles the chip transition point.

It will be appreciated from the foregoing that various modifications to the embodiments may occur to those skilled in the art without departing from the spirit and scope of the invention, which should not be limited except as defined by the appended claims. For instance, even though the description above has been provided in terms of the GPS systems, the present invention can also be applied to other types of satellite navigational systems such as the Russian GLONASS or others.

What is claimed is:

1. An apparatus for tracking an input signal, comprising:
    a local signal generator configured to generate a local replica signal of the input signal;
    a gated signal generator coupled to the local signal generator and configured to generate N gated signals, wherein the N gated signals are generated based on the local replica signal time-divided by M intervals within a chip period of the local replica signal, N and M are positive integers, and each of the gated signals has a time varying value within each chip period of the local replica signal;
    a plurality of correlators configured to multiply the N gated signals with the input signal to generate a plurality of correlation values; and
    a processor coupled to the local signal generator configured to adjust timing of the local replica signal based on the correlation values in order to accurately track the input signal with the local replica signal.

2. The apparatus according to claim 1 wherein each gated signal is associated with a respective one of the M intervals, and wherein each gated signal has a time varying value within the associated one of the M intervals and has a constant zero value in all other ones of the M intervals.

3. The apparatus according to claim 2 wherein a first gated signal among the N gated signals is associated with a first interval of the M intervals,
    a second gated signal among the N gated signals is associated with a second interval of the M intervals,
    the first and second intervals are located before and after a first transition point, respectively, and
    the first transition point is a starting point of each chip period.

4. The apparatus according to claim 3 wherein
    a first correlator among the plurality of correlators is configured to multiply the first gated signal with the input signal to generate a first correlation value among the N correlation values, and
    a second correlator among the plurality of correlators is configured to multiply the second gated signal with the input signal to generate a second correlation value among the N correlation values.

5. The apparatus according to claim 4 wherein the processor is further configured to adjust timing of the local replica signal based on a sum of the first and second correlation values.

6. The apparatus according to claim 4 wherein the first and the second intervals are located closest to the first transition point among intervals located before and after the first transition point, respectively.

7. The apparatus according to claim 6 wherein
    a third gated signal among the N gated signals is associated with a third interval of the M intervals, and
    a fourth gated signal among the N gated signals is associated with a fourth interval of the M intervals,
    the third and fourth intervals are second closest intervals to the first transition point among intervals located before and after the transition point, respectively,
    a third correlator among the plurality of correlators is configured to multiply the third gated signal with the input signal to generate a third correlation value among the N correlation values, and
    a fourth correlator among the plurality of correlators is configured to multiply the fourth gated signal with the input signal to generate a fourth correlation value among the N correlation values.

8. The apparatus according to claim 7 wherein the processor is further configured to adjust timing of the local replica signal based on a sum of the first and second correlation values subtracted by a sum of the third and fourth correlation values.

9. The apparatus according to claim 7 wherein N is equal to M.

10. The apparatus according to claim 9 wherein the processor is further configured to adjust timing of the local replica signal based on a sum of the N correlation values.

11. The apparatus according to claim 7 wherein a fifth gated signal among the N gated signals is associated with a fifth interval of the M intervals,
    a sixth gated signal among the N gated signals is associated with a sixth interval of the M intervals,
    a seventh gated signal among the N gated signals is associated with a seventh interval of the M intervals,
    an eighth gated signal among the N gated signals is associated with an eighth interval of the M intervals,
    the fourth and the fifth intervals are located closest to a second transition point among intervals located before and after the second transition point, respectively,
    the third and fourth intervals are second closest intervals to the second transition point among M intervals located before and after the second transition point, respectively, and
    the second transition point is a starting point of a previous chip period that occurs one chip period before a current chip period.

12. The apparatus according to claim 11 wherein
    a fifth correlator among the plurality of correlators is configured to multiply the fifth gated signal with the input signal to generate a fifth correlation value among the N correlation values,
    a sixth correlator among the plurality of correlators is configured to multiply the sixth gated input signal with the input signal to generate a sixth correlation value among the N correlation values, a seventh correlator among the plurality of correlators is configured to multiply the seventh gated signal with the input signal to generate a seventh correlation value among the N correlation values, and an eighth correlator among the plurality of correlators is configured to multiply the eighth gated signal with the input signal to generate an eighth correlation value among the N correlation values.

13. The apparatus according to claim 12 wherein the processor is further configured to adjust timing of the local replica signal based on a sum of the fifth and sixth correlation values subtracted by a sum of the seventh and eighth correlation values.

14. An apparatus for processing at least one satellite-based navigation broadcast signal that includes a carrier frequency signal modulated by a Pseudo Random Code (PRN) signal, comprising:

an intermediate frequency (IF) processor configured to downconvert the broadcast signal to generate a first channel signal;

an angle rotator configured to further downconvert the first channel signal, to thereby recover the PRN signal from the broadcast signal;

a signal generator configured to generate N gated PRN signals, wherein the N gated PRN signals are generated based on a local replica PRN signal time-divided by M intervals within a chip period of the local replica PRN signal, N and M are positive integers, and each of the gated signals has a time varying value within each chin period of the local replica signal; and a first plurality of correlators each of which is configured to multiply a respective one of N gated PRN signals with a first phase signal of the PRN signal to generate a first plurality correlation values.

15. The apparatus according to claim 14 further comprising:

a first processor configured to adjust timing of the local replica PRN signal based on the first plurality of correlation values in order to accurately track the PRN signal with the local replica PRN signal.

16. The apparatus according to claim 15 further comprising:

a C/A code generator coupled to the processor and the first signal generator, wherein the PRN signal is a C/A code signal of the broadcast signal and the C/A code generator is configured to generate the local replica PRN signal.

17. The apparatus according to claim 15 further comprising:

a P code generator coupled to the processor and the first signal generator, wherein the PRN signal is a P code signal of the broadcast signal and the P code generator is configured to generate the local replica PRN signal.

18. An apparatus for processing at least one satellite-based navigation broadcast signal that includes a carrier frequency signal modulated by a Pseudo Random Code (PRN) signal, comprising:

an intermediate frequency (IF) processor configured to downconvert the broadcast signal to generate a first channel signal;

an angle rotator configured to further downconvert the first channel signal, to thereby recover the PRN signal from the broadcast signal;

a signal generator configured to generate N gated PRN signals, wherein the N gated PRN signals are generated based on a local replica PRN signal time-divided by M intervals within a chip period of the local replica PRN signal, and N and M are positive integers;

a first plurality of correlators each of which is configured to multiply a respective one of N gated PRN signals with a first phase signal of the PRN signal to generate a first plurality correlation values;

a first processor configured to adjust timing of the local replica PRN signal based on the first plurality of correlation values in order to accurately track the PRN signal with the local replica PRN signal; and a memory device coupled to the N correlators and the processor, wherein the memory device includes:

a first transition-product-memory means configured to receive the first plurality of correlation values only when the local replica PRN signal changes its value at a first transition point and configured to store the received values, wherein the first transition point is a starting point of each chip period.

19. The apparatus according to claim 18 wherein the processor is further configured to adjust timing of the local replica PRN signal based on the first plurality of correlation values stored in the first transition-product-memory means.

20. The apparatus according to claim 18 wherein the memory device comprises:

a product-memory means configured to receive the first plurality of correlation values only when the local replica PRN signal does not change its value at the first transition point and configured to store the received values.

21. The apparatus according to claim 20 wherein the processor is further configured to adjust timing of the local replica PRN signal based on the first plurality of correlation values stored in the product-memory means added to corresponding values stored in the first transition-product-memory means.

22. The apparatus according to claim 20 wherein the processor is further configured to adjust timing of the local replica PRN signal based on the first plurality of correlated values stored in the product-memory means subtracted by corresponding values stored in the first transition-product-memory means.

23. The apparatus according to claim 15 wherein M is equal to one of the values of ten (10) and forty (40).

24. The apparatus according to claim 15 wherein the chip period is equally divided into M equal intervals.

25. The apparatus according to claim 15 wherein each N gated PRN signal is associated with one of the M intervals, and wherein each N gated PRN signal has a time varying value within the associated one of the M intervals and has a constant zero value in all other ones of the M intervals.

26. The apparatus according to claim 25 wherein each N gated PRN signal has the time varying value within the associated one of the M intervals only when the local replica PRN signal changes its value at a first transition point, wherein the first transition point is a starting point of each chip period.

27. The apparatus according to claim 25 wherein each N gated PRN signal has the time varying value within the associated one of the M intervals only when the local replica PRN signal does not change its value at a first transition point, wherein the first transition point is a starting point of each chip period.

28. The apparatus according to claim 25 wherein a first gated PRN signal among the N gated PRN signals is associated with a first interval of the M intervals, and
  a second gated PRN signal among the N gated PRN signals is associated with a second interval of the M intervals,
  wherein the first and second intervals are located before and after a first transition point, respectively, and the first transition point is a starting point of each chip period.

29. The apparatus according to claim 28 wherein
  a first correlator among the first set of N correlators is configured to multiply the first gated PRN signal with the PRN signal to generate a first correlation value among the first plurality of correlation values, and
  a second correlator among the first set of N correlators is configured to multiply the second gated PRN signal with the PRN signal to generate a second correlation value among the first plurality of correlation values.

30. The apparatus according to claim 29 wherein the processor is further configured to adjust timing of the local replica PRN signal based on a sum of the first and second correlation values.

31. The apparatus according to claim 29 wherein the first and the second intervals are located closest to the first transition point among intervals located before and after the transition point, respectively.

32. The apparatus according to claim 31 wherein
  a third gated PRN signal among the N gated PRN signals is associated with a third interval of the M intervals, and
  a fourth gated PRN signal among the N gated PRN signals is associated with a fourth interval of the M intervals,
  the third and fourth intervals are second closest intervals to the second transition point among intervals located before and after the transition point, respectively,
  a third correlator among the first set of N correlators is configured to multiply the third gated PRN signal with the PRN signal to generate a third correlation value among the first plurality of correlation values, and
  a fourth correlator among the first set of N correlators is configured to multiply the fourth gated PRN signal with the PRN signal to generate a fourth correlation value among the first plurality of correlation values.

33. The apparatus according to claim 32 wherein the processor is further configured to adjust timing of the local replica PRN signal based on a sum of the first and second correlation values subtracted by a sum of the third and fourth correlation values.

34. The apparatus according to claim 25 wherein N is equal to M.

35. The apparatus according to claim 34 wherein the processor is further configured to adjust timing of the local replica PRN signal based on a sum of the first plurality of correlation values.

36. The apparatus according to claim 25 wherein a fifth gated PRN signal among the N gated PRN signals is associated with a fifth interval of the M intervals,
  a sixth gated PRN signal among the N gated PRN signals is associated with a sixth interval of the M intervals,
  a seventh gated PRN signal among the N gated PRN signals is associated with a seventh interval of the M intervals,
  an eighth gated PRN signal among the N gated PRN signals is associated with an eighth interval of the M intervals,
  the fourth and the fifth intervals are located closest to a second transition point among M intervals located before and after the second transition point, respectively,
  the third and fourth intervals are second closest intervals to the second transition point among M intervals located before and after the second transition point, respectively, and
  the second transition point is a starting point of a previous chip period that occurs one chip period before a current chip period.

37. The apparatus according to claim 36 wherein
  a fifth correlator among the N correlators is configured to multiply the fifth gated PRN signal with the PRN signal to generate a fifth correlation value among the first plurality of correlation values,
  a sixth correlator among the N correlators is configured to multiply the sixth gated PRN signal with the PRN signal to generate a sixth correlation value among the first plurality of correlation values,
  a seventh correlator among the N correlators is configured to multiply the seventh N gated PRN signal with the PRN signal to generate a seventh correlation value among the first plurality of correlation values, and
  an eighth correlator among the N correlators is configured to multiply the eighth gated PRN signal with the PRN signal to generate an eighth correlation value among the first plurality of correlation values.

38. The apparatus according to claim 37 wherein the processor is further configured to adjust timing of the local replica PRN signal based on a sum of the fifth and sixth correlation values subtracted by a sum of the seventh and eighth correlation values.

39. The apparatus according to claim 25 further including a second plurality correlators each of which is configured to multiply the N gated PRN signals with a second phase signal of the PRN signal to generate a second plurality of correlation values.

40. The apparatus according to claim 39 wherein
  a third gated PRN signal among the N gated PRN signals is associated with a third interval of the M intervals,
  a fourth gated PRN signal among the N gated PRN signals is associated with a fourth interval of the M intervals,
  the third and fourth intervals are second closest intervals to a first transition point among M intervals located before and after the fourth transition point, respectively,
  wherein the first transition point is a starting point of each chip period,
  a third correlator among the first plurality of correlators is configured to multiply the third N gated PRN signal with the first phase signal of the PRN signal to generate a third correlation value among the first plurality of correlation values,
  a fourth correlator among the first plurality of correlators is configured to multiply the fourth N gated PRN signal with the first phase signal of the PRN signal to generate a fourth correlation value among the first plurality of correlation values,
  a first correlator among the second plurality of correlators is configured to multiply the third N gated PRN signal with the second phase signal of the PRN signal to generate a first correlation value among the second plurality of correlation values, and
  a second correlator among the second plurality of correlators is configured to multiply the fourth N gated PRN signal with the second phase signal of the PRN signal to generate a second correlation value among the second plurality of correlation values.

41. The apparatus according to claim 40 further comprising:
a second transition-product-memory means coupled to the processor configured to receive the third and fourth correlation values among the first plurality of correlation values and, first and second correlation values from the second plurality of correlation values only when the local replica PRN signal changes its value at the first transition point and configured to store the received values as a first, second, third and fourth stored values respectively.

42. The apparatus according to claim 41 further comprising:
a carrier lock loop coupled to the angle rotator and configured to recover the carrier frequency signal based on, in part, the fourth stored value subtracted by the third stored value which is then divided by a result of the first stored value subtracted by the second stored value.

43. The apparatus according to claim 25 wherein the M is an even integer number, and a first half and a second half of the M intervals are located before and after a first transition point, respectively, and the first transition point is a starting point of each chip period.

44. The apparatus according to claim 43 wherein a pair of the N gated PRN signals associated with a pair among the M intervals equidistanced from the first transition point are added before being multiplied by a respective correlator among the first plurality of correlators.

45. The apparatus according to claim 14 further comprising:
a second processor configured to monitor for distortions in the broadcast signal based on a relationship among the first plurality of correlation values.

46. The apparatus according to claim 14 wherein the relationship among the first plurality of correlation values is an average value thereof.

47. A method of tracking an input signal, comprising the steps of:
generating a local replica signal of the input signal;
generating N gated signals based on the local replica signal time-divided by M intervals within a chip period of the local replica signal, wherein N and M are positive integers, and each of the gated signals has a time varying value within each chip period of the local replica signal;
multiplying the N gated signals with the input signal to generate a plurality of correlation values; and
adjust timing of the local replica signal based on the correlation values in order to accurately track the input signal with the local replica signal.

48. The method according to claim 47 wherein each gated signal is associated with a respective one of the M intervals, and
wherein each gated signal has a time varying value within the associated one of the M intervals and has a constant zero value in all other ones of the M intervals.

49. The method according to claim 48 wherein a first gated signal among the N gated signals is associated with a first interval of the M intervals,
a second gated signal among the N gated signals is associated with a second interval of the M intervals,
the first and second intervals are located before and after a first transition point, respectively, and the first transition point is a starting point of each chip period.

50. The method according to claim 49 wherein the multiplying step further comprises the steps of:
multiplying the first gated signal with the input signal to generate a first correlation value among the N correlation values, and
multiplying the second gated signal with the input signal to generate a second correlation value among the N correlation values.

51. The method according to claim 50 wherein the adjusting step further comprises the step of:
adjusting timing of the local replica signal based on a sum of the first and second correlation values.

52. The method according to claim 50 wherein the first and the second intervals are located closest to the first transition point among intervals located before and after the first transition point, respectively.

53. The method according to claim 52 wherein
a third gated signal among the N gated signals is associated with a third interval of the M intervals, and
a fourth gated signal among the N gated signals is associated with a fourth interval of the M intervals,
the third and fourth intervals are second closest intervals to the first transition point among intervals located before and after the transition point, respectively, and
wherein the multiplying step further comprises the steps of:
multiplying the third gated signal with the input signal to generate a third correlation value among the N correlation values, and
multiplying the fourth gated signal with the input signal to generate a fourth correlation value among the N correlation values.

54. The method according to claim 53 wherein the adjusting step further comprises the step of:
adjusting timing of the local replica signal based on a sum of the first and second correlation values subtracted by a sum of the third and fourth correlation values.

55. The method according to claim 48 wherein N is equal to M.

56. The method according to claim 55 wherein the adjusting step further comprises the step of:
adjusting timing of the local replica signal based on a sum of the N correlation values.

57. The method according to claim 48 wherein a fifth gated signal among the N gated signals is associated with a fifth interval of the M intervals,
a sixth gated signal among the N gated signals is associated with a sixth interval of the M intervals,
a seventh gated signal among the N gated signals is associated with a seventh interval of the M intervals,
an eighth gated signal among the N gated signals is associated with an eighth interval of the M intervals,
the fourth and the fifth intervals are located closest to a second transition point among intervals located before and after the second transition point, respectively,
the third and fourth intervals are second closest intervals to the second transition point among M intervals located before and after the second transition point, respectively, and
the second transition point is a starting point of a previous chip period that occurs one chip period before a current chip period.

58. The method according to claim 57 wherein the multiplying step further comprises the steps of:
multiplying the fifth gated signal with the input signal to generate a fifth correlation value among the N correlation values,
multiplying the sixth gated input signal with the input signal to generate a sixth correlation value among the N correlation values,
multiplying the seventh gated signal with the input signal to generate a seventh correlation value among the N correlation values, and
multiplying the eighth gated signal with the input signal to generate an eighth correlation value among the N correlation values.

59. The method according to claim 58 wherein the adjusting step further comprises the step of:
adjusting timing of the local replica signal based on a sum of the fifth and sixth correlation values subtracted by a sum of the seventh and eighth correlation values.

60. A method of processing at least one satellite-based navigation broadcast signal that includes a carrier frequency signal modulated by a Pseudo Random Code (PRN) signal, comprising the step of:
downconverting the broadcast signal, to thereby recover the PRN signal from the broadcast signal;
generating N gated PRN signals based on a local replica PRN signal time-divided by M intervals within a chip period of the local replica PRN signal, wherein N and M are positive integers, and each of the gated PRN signals has a time varying value within each chip period of the local replica PRN signal; and
multiplying the N gated PRN signals with a first phase signal of the PRN signal to generate a first plurality correlation values.

61. The method according to claim 60 further comprising the step of:
adjusting timing of the local replica PRN signal based on the first plurality of correlation values in order to accurately track the PRN signal with the local replica PRN signal.

62. The method according to claim 61 further comprising the step of:
generating a C/A code signal as the local replica PRN signal, wherein the PRN signal is a C/A code signal of the broadcast signal.

63. The method according to claim 61 further comprising the step of:
generating a P code signal as the local replica PRN signal, wherein the PRN signal is a P code signal of the broadcast signal.

64. A method of processing at least one satellite-based navigation broadcast signal that includes a carrier frequency signal modulated by a Pseudo Random Code (PRN) signal, comprising the step of:
downconverting the broadcast signal, to thereby recover the PRN signal from the broadcast signal;
generating N gated PRN signals based on a local replica PRN signal time-divided by M intervals within a chip period of the local replica PRN signal, wherein N and M are positive integers;
multiplying the N gated PRN signals with a first phase signal of the PRN signal to generate a first plurality correlation values;
adjusting timing of the local replica PRN signal based on the first plurality of correlation values in order to accurately track the PRN signal with the local replica PRN signal; and
storing the first plurality of correlation values as first transition-product values only when the local replica PRN signal changes its value at a first transition point, wherein the first transition point is a starting point of each chip period.

65. The method according to claim 64 wherein adjusting step further comprises the step of:
adjusting timing of the local replica PRN signal based on the first plurality of correlation values stored in the first transition-product-memory means.

66. The method according to claim 64 further comprising the step of:
storing the first plurality of correlation values as non-transition-product values only when the local replica PRN signal changes its value at the first transition point.

67. The method according to claim 66 wherein the adjusting step further comprises the step of:
adjusting timing of the local replica PRN signal based on the first transition-product values added to corresponding non-transition-product values.

68. The method according to claim 66 wherein the adjusting step further comprises the step of:
adjusting timing of the local replica PRN signal based on the first non-transition-product values subtracted by corresponding transition-product values.

69. The method according to claim 61 wherein M is equal to one of the values of ten (10) and forty (40).

70. The method according to claim 61 wherein the chip period is equally divided into M equal intervals.

71. The method according to claim 61 wherein each N gated PRN signal is associated with one of the M intervals, and
wherein each N gated PRN signal has a time varying value within the associated one of the M intervals and has a constant zero value in all other ones of the M intervals.

72. The apparatus according to claim 71 wherein each N gated PRN signal has the time varying value within the associated one of the M intervals only when the local replica PRN signal changes its value at a first transition point, wherein the first transition point is a starting point of each chip period.

73. The apparatus according to claim 71 wherein each N gated PRN signal has the time varying value within the associated one of the M intervals only when the local replica PRN signal does not change its value at a first transition point, wherein the first transition point is a starting point of each chip period.

74. The method according to claim 71 wherein a first gated PRN signal among the N gated PRN signals is associated with a first interval of the M intervals, and
a second gated PRN signal among the N gated PRN signals is associated with a second interval of the M intervals,
wherein the first and second intervals are located before and after a first transition point, respectively, and the first transition point is a starting point of each chip period.

75. The method according to claim 74 wherein the multiplying step further comprises the steps of:
multiplying the first gated PRN signal with the PRN signal to generate a first correlation value among the first plurality of correlation values, and multiplying the second gated PRN signal with the PRN signal to generate a second correlation value among the first plurality of correlation values.

76. The method according to claim 75 wherein adjusting step further comprises the step of:
adjusting timing of the local replica PRN signal based on a sum of the first and second correlation values.

77. The method according to claim 75 wherein the first and the second intervals are located closest to the first transition point among intervals located before and after the transition point, respectively.

78. The method according to claim 77 wherein
a third gated PRN signal among the N gated PRN signals is associated with a third interval of the M intervals, and
a fourth gated PRN signal among the N gated PRN signals is associated with a fourth interval of the M intervals,
the third and fourth intervals are second closest intervals to the second transition point among intervals located before and after the transition point, respectively, and
the step of multiplying the N gated PRN signals with the first phase signal of the PRN signal further comprises the steps of:
multiplying the third gated PRN signal with the PRN signal to generate a third correlation value among the first plurality of correlation values, and
multiplying the fourth gated PRN signal with the PRN signal to generate a fourth correlation value among the first plurality of correlation values.

79. The method according to claim 78 wherein the adjusting step further comprises the step of:
adjusting timing of the local replica PRN signal based on a sum of the first and second correlation values subtracted by a sum of the third and fourth correlation values.

80. The method according to claim 71 wherein N is equal to M.

81. The method according to claim 80 wherein the adjusting step further comprises the step of:
adjusting timing of the local replica PRN signal based on a sum of the first plurality of correlation values.

82. The method according to claim 71 wherein a fifth gated PRN signal among the N gated PRN signals is associated with a fifth interval of the M intervals,
a sixth gated PRN signal among the N gated PRN signals is associated with a sixth interval of the M intervals,
a seventh gated PRN signal among the N gated PRN signals is associated with a seventh interval of the M intervals,
an eighth gated PRN signal among the N gated PRN signals is associated with an eighth interval of the M intervals,
the fourth and the fifth intervals are located closest to a second transition point among M intervals located before and after the second transition point, respectively,
the third and fourth intervals are second closest intervals to the second transition point among M intervals located before and after the second transition point, respectively, and
the second transition point is a starting point of a previous chip period that occurs one chip period before a current chip period.

83. The method according to claim 82 wherein the multiplying step further comprises the steps of:

multiplying the fifth gated PRN signal with the PRN signal to generate a fifth correlation value among the first plurality of correlation values,
multiplying the sixth gated PRN signal with the PRN signal to generate a sixth correlation value among the first plurality of correlation values,
multiplying the seventh N gated PRN signal with the PRN signal to generate a seventh correlation value among the first plurality of correlation values, and
multiplying the eighth gated PRN signal with the PRN signal to generate an eighth correlation value among the first plurality of correlation values.

84. The method according to claim 83 wherein the adjusting step further comprises the step of:
adjusting timing of the local replica PRN signal based on a sum of the fifth and sixth correlation values subtracted by a sum of the seventh and eighth correlation values.

85. The method according to claim 71 further including the multiplying step further comprises the steps of:
multiplying the N gated PRN signals with a second phase signal of the PRN signal to generate a second plurality of correlation values.

86. The method according to claim 85 wherein
a third gated PRN signal among the N gated PRN signals is associated with a third interval of the M intervals,
a fourth gated PRN signal among the N gated PRN signals is associated with a fourth interval of the M intervals,
the third and fourth intervals are second closest intervals to a first transition point among M intervals located before and after the fourth transition point, respectively, wherein the first transition point is a starting point of each chip period, and
the step of multiplying the N gated PRN signals with the first phase signal of the PRN signal further comprising the steps of:
multiplying the third N gated PRN signal with the first phase signal of the PRN signal to generate a third correlation value among the first plurality of correlation values,
multiplying the fourth N gated PRN signal with the first phase signal of the PRN signal to generate a fourth correlation value among the first plurality of correlation values,
multiplying the third N gated PRN signal with the second phase signal of the PRN signal to generate a first correlation value among the second plurality of correlation values, and
multiplying the fourth N gated PRN signal with the second phase signal of the PRN signal to generate a second correlation value among the second plurality of correlation values.

87. The method according to claim 86 further comprising: storing the third and fourth correlation values among the first plurality of correlation values and, first and second correlation values from the second plurality of correlation values only when the local replica PRN signal changes its value at the first transition point as a first, second, third and fourth stored values respectively.

88. The method according to claim 87 further comprising: recovering the carrier frequency signal based on, in part, the fourth stored value subtracted by the third stored value which is then divided by a result of the first stored value subtracted by the second stored value.

89. The method according to claim 71 wherein the M is an even integer number, and a first half and a second half of the M intervals are located before and after a first transition point, respectively, and the first transition point is a starting point of each chip period.

90. The method according to claim 89 wherein a pair of the N gated PRN signals associated with a pair among the M intervals equidistanced from the first transition point are added before being multiplied by a respective correlator among the first plurality of correlators.

91. The method according to claim 60 further comprising:
monitoring for distortions in the broadcast signal based on a relationship among the first plurality of correlation values.

92. The method according to claim 60 wherein the relationship among the first plurality of correlation values is an average value thereof.

* * * * *